United States Patent [19]

Tack et al.

[11] Patent Number: 5,620,652
[45] Date of Patent: Apr. 15, 1997

[54] ALUMINUM ALLOYS CONTAINING SCANDIUM WITH ZIRCONIUM ADDITIONS

[75] Inventors: William T. Tack, Castle Rock, Colo.; Inge L. H. Hansson, Mississauga, Canada

[73] Assignee: Ashurst Technology Corporation (Ireland) Limited, County Clare, Ireland

[21] Appl. No.: 410,801

[22] Filed: Mar. 27, 1995

Related U.S. Application Data

[63] Continuation-in-part of Ser. No. 249,023, May 25, 1994, abandoned.

[51] Int. Cl.[6] ................................................. C22C 21/00
[52] U.S. Cl. ........................................ 420/532; 420/544
[58] Field of Search ................................ 420/552, 535, 420/543, 551, 532, 544

[56] References Cited

U.S. PATENT DOCUMENTS

| | | | |
|---|---|---|---|
| 2,806,128 | 9/1957 | Muiler | 219/146 |
| 3,104,252 | 9/1963 | Radd et al. | 260/448 |
| 3,326,820 | 6/1967 | Cuomo et al. | 252/478 |
| 3,382,269 | 5/1968 | Williams et al. | 260/448 |
| 3,395,001 | 7/1968 | Stroup et al. | 29/197.5 |
| 3,440,712 | 4/1969 | Stroup et al. | 29/494 |
| 3,619,181 | 11/1971 | Willey | 75/138 |
| 4,082,573 | 4/1978 | Schoerner et al. | 148/2 |
| 4,126,242 | 11/1978 | Yajima et al. | 220/83 |
| 4,689,090 | 8/1987 | Sawtell et al. | 148/2 |
| 4,902,654 | 2/1990 | Aubert et al. | 501/117 |
| 4,929,511 | 5/1990 | Bye, Jr. et al. | 428/606 |
| 4,950,560 | 8/1990 | Tarcy | 429/27 |
| 4,962,504 | 10/1990 | Aubert et al. | 372/41 |
| 5,037,608 | 8/1991 | Tarcy et al. | 420/528 |
| 5,055,255 | 10/1991 | Scott et al. | 420/534 |
| 5,055,257 | 10/1991 | Chakrabarti et al. | 420/902 |
| 5,059,390 | 10/1991 | Burleigh et al. | 420/405 |
| 5,066,342 | 11/1991 | Rioja et al. | 148/12.7 A |
| 5,076,340 | 12/1991 | Bruski et al. | 164/97 |
| 5,133,931 | 7/1992 | Cho | 420/541 |
| 5,198,045 | 3/1993 | Cho et al. | 148/552 |
| 5,211,910 | 5/1993 | Pickens et al. | 420/532 |
| 5,389,165 | 2/1995 | Cho | 420/529 |

OTHER PUBLICATIONS

Jiang, et al., "Effects of Minor Additions on Precipitation and Properties of Al–Li–Cu–Mg–Zr Alloy," *Scripta Metallurgica et Materialia*, vol. 29, pp. 211–216.

Bradley, et al., "Superplastic Properties of An Al–2–4Mg–1.8Li–0.55c Alloy," *Scripta Metallurgica et Materialia*, vol. 25, pp. 717–721.

Sawtell, et al., "Exploratory Alloy Development in the System Al–Sc–X," *Dispersion Strengthened Aluminium Alloys*, pp. 409–420.

Dutkiewicz, et al., "Effect of Scandium on the Decomposition of Aluminium–Zinc Alloys," *Journal of Materials Science*, 27 (1993) pp. 3032–3035.

Blake, et al., "Constitution and Age Hardening of Al–Sc Alloys," *Journal of Materials Science*, 20 (1985), pp. 2861–2867.

Fridlyander, et al., "Soviet Al–Li Alloys of Aerospace Application," *Papers presented at the Sixth International Aluminum – Lithium Conference*, vol. 1 (1991), pp. 35–42.

Fridlyander, et al., "Structure and Properties of Al–Li Alloys. Alloyed With Scandium," *Papers presented at the Sixth International Aluminum – Lithium Conference*, vol. 1 (1991), pp. 381–386.

(List continued on next page.)

*Primary Examiner*—Deborah Yee

[57] ABSTRACT

Applications for aluminum alloys containing scandium with or without zirconium additions. Such modified aluminum alloys possess enhanced properties and exhibit improved processing characteristics, and, as such, are especially suited for use in recreational and athletic structures and components, and in certain aerospace, ground transportation and marine structures and components.

29 Claims, 2 Drawing Sheets

OTHER PUBLICATIONS

Fridlyander, et al., "High–Strength Weldable 1460 Alloy for Cryogenic Application," *Papers presented at the Sixth International Aluminum – Lithium Conference*, vol. 1 (1991), pp. 1245–1250.

Kaygorodova, et al., "The Effect of Small Sc and Mg Addition on Al–Li–Cu–Zr Alloy Structure and Mechanical Properties," *Papers presented at the Sixth International Aluminum – Lithium Conference*, vol. 1 (1991), pp. 363–367.

Fridlyander, et al., "The Effect of Scandium on Decomposition Kinetics in Aluminium–Lithium Alloys," *Papers presented at the Sixth International Aluminum – Lithium Conference*, vol. 1 (1991), pp. 107–112.

Fridlyander, et al., "Fatigue Strength of Al–Cu–Li Alloy at Temperature 293–4 K," *Papers presented at the Sixth International Aluminum – Lithium Conference*, vol. 1 (1991), pp. 615–620.

Fridlyander, et al., "The Peculiarities of Grain Structure of Aluminum–Lithium Alloys," *Papers presented at the Sixth International Aluminum – Lithium Conference*, vol. 1 (1991), pp. 867–871.

Kolobnev, et al., "Superplasticity of Al–Mg–Li System Alloys," *Papers presented at the Sixth International Aluminum – Lithium Conference*, vol. 1 (1991), pp. 1053–1056.

Tsenev, et al., "Mechanical Properties of Submicron Grained Al–Li Alloys," *Papers presented at the Sixth International Aluminum – Lithium Conference*, vol. 1 (1991), pp. 1125–1132.

Munroe, P.R., "The Effect of Scandium on the Crystal Structure of $Ti_3Al$," *Scripta Metallurgica et Materialia*, vol. 27, pp. 1373–1378.

Sawtell and Jensen, "Mechanical Properties and Microstructures of Al–Mg–Sc Alloys," *Metallurgical Transactions A*, vol.21A, pp. 421–430.

Hyland, R.W., "Homogeneous Nucleation Kinetics of $Al_3Sc$ in a Dilute Al–Sc Alloy," *Metallurgical Transactions A*, vol. 23A, pp. 1947–1955.

Emigh, et al., "Superplastic Studies in the Al–Li–Sc–Mg System," *Superplasticity in Aerospace II*, pp. 303–315.

ALUMINUM ALLOYS CONTAINING SCANDIUM WITH ZIRCONIUM ADDITIONS

This patent application is a continuation in part of U.S. patent application Ser. No. 08/249,023, filed May 25, 1994, now abandoned, the entire disclosure of which is incorporated by reference herein.

FIELD OF THE INVENTION

The present invention relates generally to applications for aluminum-based alloys and, more particularly, to scandium (Sc) containing aluminum alloys. Areas where enhanced performance is necessary, including recreational products, along with aerospace, ground transportation and marine structures, are emphasized.

BACKGROUND OF THE INVENTION

Aluminum alloys possess an excellent combination of mechanical and physical properties. By combining these properties of aluminum alloys with the relatively low density of such alloys, designers are able to produce reliable, lightweight structures. Moreover, a wide range of alloy systems and tempers offer structural designers several options to utilize the appropriate alloys that are specifically designed for particular operating loads or environments.

It is typical for all aluminum alloys to contain grain refining elements such as Zr, Ti, Cr, Mn and V. Grain refining elements help nucleate grains during casting by forming intermetallic phases with Al. For example, Ti will form the $TiAl_3$ phase which nucleates an $\alpha$—aluminum particle as solidification of the molten metal occurs. The large number of $TiAl_3$ particles help to nucleate $\alpha$—aluminum in several areas. Accordingly, the solidified grain structure is much finer than would be observed in an aluminum alloy without grain refining additions, thereby improving the fabricability during subsequent hot working operations.

Another function of a grain refining element is to form coherent (e.g., $Al_3Zr$) and non-coherent (e.g., $Al_{12}Mg_2Cr$ and $Al_{20}Mn_3Cu_2$) insoluble phases during casting and ingot preheat. These thermally stable dispersoids prevent or delay static recrystallization during processing. In addition, the dispersoid phase pins the elongated grain boundaries that develop during processing and inhibits recrystallization that would otherwise occur during the solution heat treatment steps.

Among all alloying elements used to strengthen wrought aluminum alloys, scandium (Sc), despite its rare occurrence, has received significant attention. For instance, U.S. Pat. No. 3,619,181 to Willey discloses the addition of Sc to a wide range of binary, ternary and multicomponent alloy systems. It is claimed that the aluminum alloys that can be strengthened with Sc additions include wrought aluminum alloys identified by the Aluminum Association such as 7075, 7079, 7178, 7005, 7039, 6061, 6351, 6161, 6063, 5005, 5050, 5052, 5083, 5454, 5456, 3003, 3005, 2014, 2017, 2618, 2219, 2020 and 2024. Several model alloy systems were fabricated with and without Sc additions and tested for strength and ductility. Additions of 0.2 to 0.4 weight percent Sc caused both tensile strength and yield strength to increase by between 6 and 50 percent. The use of a cold working step for the Sc alloys caused further increases in strength.

Sawtell and Jensen reported enhanced strength and superplastic formability when adding Sc to the wrought Al-Mg system (see "Mechanical Properties and Microstructures of Al-Mg-Sc alloys," Sawtell, R. R. and Jensen C. L., *Metallurgical Transactions*, V. 21A, February, 1990, pp. 421–430). It was stated that the equilibrium precipitate phase $Al_3Sc$ is the most potent strengthener known in the aluminum based alloy system on an equal atomic fraction basis.

U.S. Pat. No. 5,055,257 to Chakrabarti et al. documents the enhancement of superplastic forming by using the thermal stability of the $Al_3Sc$ precipitates. Improvement in total superplastic elongation was achieved in a wrought Al-Mg alloy. It was also noted that the total time to achieve a certain strain level was two orders of magnitude greater than previously achieved with other superplastic alloys. Based on this information, it was emphasized that similar mechanistic improvements can be realized for other wrought aluminum alloys in the 2XXX and 7XXX systems.

U.S. Patent application, from which this patent application is a continuation-in-part thereof, Ser. No. 08/249,023, filed May 25, 1994, discloses the use of Sc in combination with several other dispersoid forming elements to enhance the weldability and weld strength of aluminum alloys in the 2XXX, 5XXX, 6XXX and 7XXX wrought alloy systems. The Sc additions are especially advantageous when added to both the base alloy to be welded and the filler alloy. An alloy design technique was used whereby conventional grain refining elements such as Cr and Mn were replaced by Sc+Zr. In one particularly interesting example, alloy 6061 was subjected to a weldability test known as the "patch test" to assess its resistance to hot cracking. The total crack length measurements ranged from 31.8 mm to 43.4 mm, corroborating published data that show 6061 as the most crack sensitive alloy among all aluminum alloys. When the Cr was removed and replaced by Sc and Zr, cracking during the patch test was reduced to 0 mm. Thus, the approach to replace conventional grain refining elements with Sc+Zr can convert the worst known alloy with regard to hot cracking resistance to one that displays no hot cracking.

U.S. patent application Ser. No. 08/311,958, filed Sep. 26, 1994, discloses the use of Sc to greatly improve the strength of aluminum casting alloys. A 356 type alloy, which usually displays a 43% lower yield strength value relative to 357, was alloyed with Sc to produce a 33% strength advantage relative to 357 as measured by bend testing. Accordingly, several other aluminum casting alloys were proposed for property improvement by using the principles disclosed in the invention.

Alloy development efforts can, of course, concentrate on any number of desired objectives for a given product application. Two common design objectives for some alloy systems are enhanced strength characteristics and reduced weight. One product area where high mechanical properties and light weight is becoming paramount to performance is the field of athletic equipment. A specific athletic endeavor where use of advanced materials is increasingly evident is the bicycle, and in particular, mountain bicycles that are designed for demanding off road use such as mountain trails. The high performance models are usually comprised of a welded aluminum or titanium frame with several components such as handle bars, pedals, seatposts, wheel rims, crank arms, suspension forks, etc. that are designed using light weight, high strength metal alloys.

The importance of weight reduction in bicycles is evidenced by the significant growth of the after-market for bicycle components. Advertisements for such parts usually specify the weight of the component in grams so the rider can determine whether replacement of an existing part can be made to reduce the overall weight of the bicycle structure. This approach can be taken in lieu of purchasing an entire bicycle.

In a recent article ("How to Shave Weight", *Mountain Bike Action,* December 1994, p. 78), the importance of decreasing the weight of a bicycle was emphasized, and several steps were divulged to enable riders to decrease the total weight of the bicycle by replacing several components. As an example, a 135 gram (g) titanium handlebar or a 148 g aluminum alloy handlebar can replace an existing steel alloy handlebar, thereby shaving 100 to 200 g. The same principle was applied to seatposts, saddles, wheels and several other parts. When added together, it was stated that several pounds of weight can be shaved. This weight reduction significantly improves the climbing ability of the rider without sacrificing the structural integrity of the bicycle.

Aerospace structures are constructed primarily from aluminum alloys. Since designers are continually seeking alloys with enhanced properties to decrease the weight of aircraft, aluminum companies devote a significant amount of research and development resources to introduce new aluminum alloys with enhanced properties. Because the aerospace structure production infrastructure is already established for aluminum alloys, the typical design approach is to introduce a new alloy with improved properties that can be integrated into the structure using conventional manufacturing methods.

In simplistic terms, an alloy with improved strength can be introduced with a thickness reduction that is proportional to the strength advantage. By using a space launch vehicle as an example, it is evident that a new alloy with a 10% strength advantage can be used to decrease the thickness of the propellant tank wall by 10% while maintaining an equivalent load carrying capacity of the original alloy. On a structure such as the Space Shuttle's External Tank, a 10% reduction throughout the 66,000 pound tank structure would make a significant impact by shaving 6600 pounds. It should be noted that other properties such as stress corrosion resistance and fracture toughness, along with manufacturing processes such as welding and forming, must be thoroughly addressed before introducing a new alloy.

It is estimated that a one pound reduction in airplane structural weight will save 300 to 400 gallons of fuel over the projected lifetime of the aircraft (see Quist, W. E. et.al., "Aluminum-Lithium Alloys for Aircraft Structure—An Overview," *Aluminum-Lithium Alloys II Conference Proceedings,* Starke, E. A. Jr. and Sanders, T. H. Jr., eds., 1983, pp. 313–334.). With the potential for saving hundreds or thousands of pounds by replacement of existing aluminum alloys with alloys that display incremental property improvements, it is evident that airplane fuel consumption can be significantly reduced.

Recent government mandates have been issued to automotive manufacturers to improve fuel efficiency of vehicles and thereby decrease emissions that are harmful to the environment. Accordingly, the design strategy to reduce the vehicle weight by using aluminum alloys in place of steel is gaining momentum in the automotive industry. Automotive designers, however, must maintain the crashworthiness of the vehicle at an acceptable level while achieving weight reduction.

The benefits of vehicular weight reduction apply not only to consumer passenger vehicles, but other types as well. For instance, major transport organizations such as an urban-based bus systems could greatly benefit from reduced vehicular weights and realize a significant reduction of fuel consumption and air pollution in a specific geographical area. Moreover, a truck fleet which transports liquid or cryogenic liquid products can not only benefit from weight reduction for the above-noted reasons, but also by reducing trucking fees that are based on the total weight of the truck. Accordingly, the fee amount can be saved for every trip that a truck makes throughout the life of the vehicle.

A fourth product area where reduced weight would be advantageous is marine structures. By employing the aforementioned principles utilized in aerospace and automotive structures, marine structures can be improved by introducing high strength, corrosion resistant alloys.

SUMMARY OF THE INVENTION

The present invention generally relates to aluminum alloys which contain scandium. More specifically, the present invention includes a number of applications for which aluminum alloys containing scandium with or without zirconium additions are especially suited.

In one aspect, the present invention relates to recreational and athletic structures and components comprising aluminum alloys which include scandium and/or zirconium. More specifically, based upon enhanced properties and improved processing characteristics, modified type 2XXX, 4XXX, 5XXX, 6XXX, 7XXX, Al-Cu-Li-Mg, and Al-Mg-Li aluminum alloys are particularly useful for a variety of athletic or recreational equipment, such as bats, arrows, ski poles, hockey sticks, bicycle components, golf shafts, golf club heads, racquets, athletic wheel chairs, tent poles, snow shoes, backpack frames, wind surfing frames, lacrosse sticks, sailboat masts and booms, javelins, motorbikes, motorbike components, jetskis, seadoos, and snowmobiles.

In another aspect, the present invention relates to aerospace structures and components comprising aluminum alloys which include scandium and/or zirconium. In particular, modified aluminum alloys, such as modified 2XXX, 5XXX, 7XXX, Al-Cu-Li-Mg, and Al-Mg-Li type alloys are especially useful for aerospace structures and components, such as aircraft structures and/or launch vehicle structures.

In yet another aspect, the present invention relates to ground transportation structures and components comprising aluminum alloys which include scandium and/or zirconium. More specifically, modified aluminum alloys, such as modified 2XXX, 4XXX, 5XXX, 6XXX, 7XXX and Al-Cu-Li-Mg type alloys are particularly useful for ground transportation structures and components, such as automobile parts and components and/or people movers.

In another aspect, the present invention relates to marine structures and components comprising aluminum alloys which include scandium and/or zirconium. In particular, modified aluminum alloys, such as 4XXX, 5XXX, 7XXX, Al-Cu-Li-Mg and Al-Mg-Li type alloys are especially suited for use for certain marine structures, such as canoes, torpedo casings, scuba diving tanks, sea launched missiles, naval fighter aircraft, ferries, yachts and/or recreational boats.

DETAILED DESCRIPTION

Figure 1:
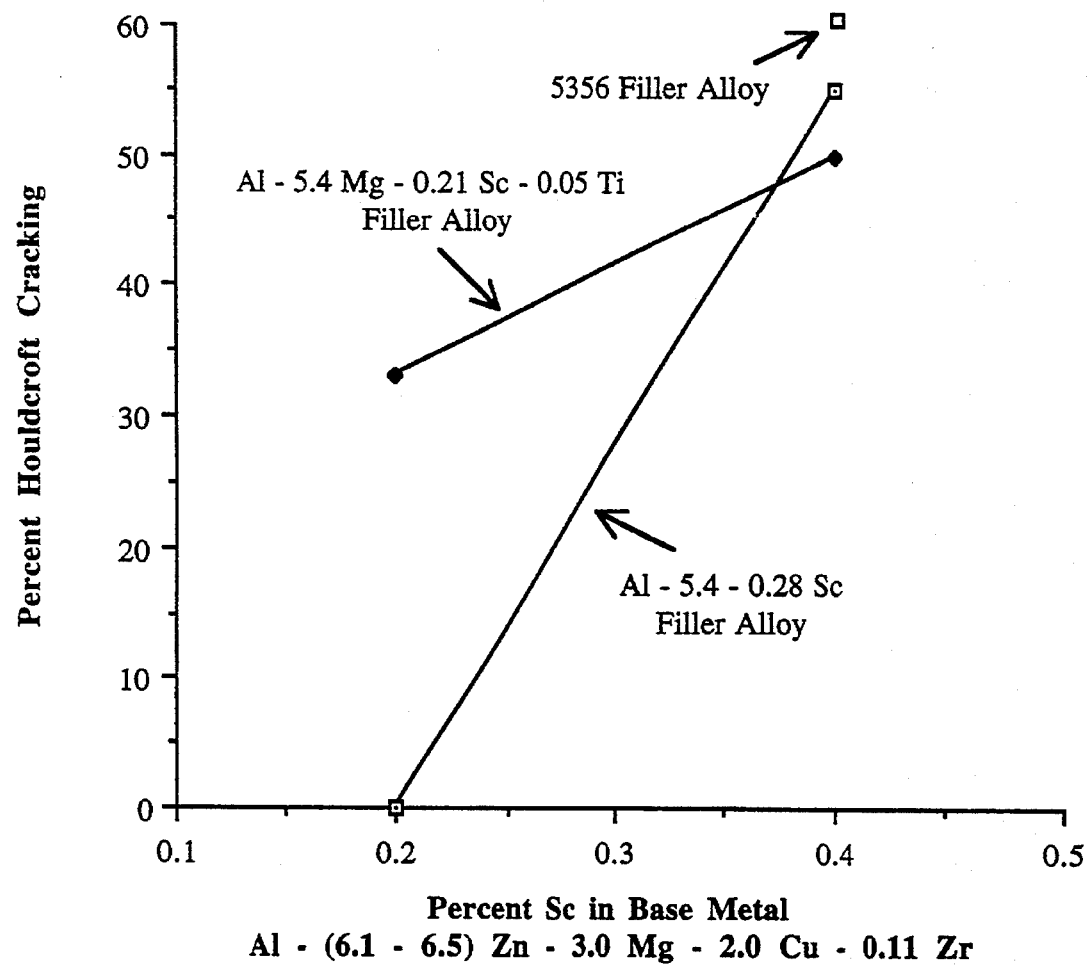
FIG. 1 illustrates the percentage of weld cracking in the Houldcroft crack susceptibility test for two Al-Mg-Sc-(Ti) filler alloys and a conventional 5356 type filler alloy in combination with an Al-Zn-Mg-Cu-Zr base alloy with various levels of Sc additions.

Methodologies are disclosed herein for assembling a structure which includes at least first and second parts. One method generally comprises the steps of selecting compositions for the first and second parts, the compositions comprising at least about 60 weight percent aluminum, selecting a filler alloy comprising scandium and at least about 60 weight percent aluminum, and welding the first and second parts utilizing the filler alloy.

The above-noted welding step may be performed utilizing any appropriate welding operation. For example, welding of aluminum alloys may be performed utilizing tungsten-inert gas welding, metal inert gas welding, plasma arc welding, laser-beam welding, electron beam welding, diffusion welding, friction welding, ultrasonic welding, explosion welding, or any other appropriate welding operation. The above-noted method is particularly useful for welding an abutting joint between the first and second parts. In this regard, the welding step may comprise positioning the first and second parts in an abutting joint geometry, such as a butt joint, a V-shaped joint or a double V-shaped joint. The first part may subsequently be welded to the second part to form a welded abutting joint.

The selection of the particular filler alloy composition may have an effect on the degree of weld performance and/or may be dictated or controlled by the composition of the base material. However, generally the filler alloy composition identified for use in the above-noted methodologies includes from about 0.02 to about 10.0, and preferably from about 0.1 to about 0.5, weight percent scandium. In a preferred embodiment, the filler alloy composition includes about 0.40 weight percent scandium. Zirconium may also be present in the filler alloy composition, preferably in the amount of from about 0.01 to about 1.0, and more preferably 0.05 to about 0.22, weight percent. In one embodiment, the filler alloy composition comprises about 0.15 weight percent zirconium. Enhanced performance of the filler alloy may be realized by utilizing specific ratios of scandium and zirconium. For instance, in one embodiment the weight ratio of the amount of scandium to the amount of zirconium in the filler alloy composition preferably ranges from about 1000:1 to about 0.02:1, more preferably, about 3:1. In fact, in one embodiment, the filler alloy may utilize only scandium and zirconium as the grain refiners.

In addition to the foregoing, it is generally desirable for the noted filler alloy composition to be free of lithium and the presence of Li would only be observed as an unavoidable impurity. Specific filler alloy compositions which conform to the foregoing include: Al - 6.0 Cu - 0.5 Sc - 0.2 Zr; Al - 5.0 Mg - 0.5 Sc - 0.15 Zr; and Al - 5.3 Si - 0.5 Sc.

Similar to the noted aluminum-scandium filler alloy, it may be desirable to include scandium in the base metal compositions when practicing the noted methodology. In this regard, the specific amounts of scandium in the compositions of such parts are generally in accordance with the amounts noted above with respect to the filler alloy. In general, however, the amount of scandium in a filler alloy will tend to be slightly higher than the amount of scandium in a corresponding base alloy to account for the generally poorer properties associated with welded filler alloys, as noted above. The compositions of the parts may further include zirconium in amounts commensurate with those noted above for the filler alloys. Moreover, the weight ratios of scandium to zirconium in the compositions are also commensurate with the noted weight ratios for the filler alloys.

One product application particularly advantageous for employing the above-noted methodology is for production of bicycles. In one embodiment for this product application, a scandium-containing, preferably aluminum, alloy may be utilized in a bicycle frame structure. As such, the methodology may be adapted for assembling the bicycle frame. This method generally includes the steps of forming a first tube comprising scandium, forming a second tube comprising scandium, and joining the first and second tubes together. This methodology may be utilized to join any of the tubes of a bicycle, including the top tube, the down tube, the head tube, the seat tube, the chain stays, and the seat stays.

The compositions of the first and second tubes may comprise scandium in amounts commensurate with those noted above for the filler alloys in the above-noted method. Further, the first and second tubes may comprise zirconium in amounts set forth above with respect to the filler alloys. Moreover, the weight ratio of the scandium to the zirconium can also be in accordance with the ranges noted above for the filler alloys.

The joining of the bicycle tubes of the noted method preferably comprises the step of welding, such that the above-identified types of filler alloy compositions may be used. When welding is utilized, the method further includes the step of selecting a filler alloy comprising scandium. The filler alloy composition is as generally set forth above in the description of the filler alloys for the method for assembling a structure.

Due to the improved properties associated with the utilization of scandium in a tubular structure, it is believed that the wall thicknesses of bicycle tubes produced according to the above-described method can be significantly reduced, at least in the welded portions. In this regard, the steps of forming first and second tubes preferably comprise forming a wall thickness in a welded portion that is 10 to 30 percent thinner than tubing used on conventional bicycles. For example, the wall thickness may be less than about 3.0 mm, preferably less than about 2.0 mm, and more preferably less than about 1.5 mm.

In addition to welding first and second parts of a structure together, methodologies are also disclosed for repairing a damaged or defective weld. Defective welds are typically caused by crack formation within the weld, especially in the heat-affected-zone. One technique for repairing the weld generally comprises grinding away at least a portion of the welded joint to form a ground portion and rewelding the ground portion utilizing a filler alloy comprising scandium, such as those described above. The grinding operation is typically performed utilizing an abrasive media, such as an abrasive disk, and typically grinds down to about 50% of the thickness of the structure being welded. The rewelding step may comprise any appropriate welding operation and preferably can be performed between five and ten times in the same area without the creation of additional cracks when utilizing one of the above-noted aluminum-scandium filler alloys, thereby maintaining the integrity of the welded joint and allowing multiple repairs to the same joint.

Particular aluminum-based alloys which are particularly useful in the above-described methods, as well as product methodologies described below, are also disclosed herein. One such alloy is a modification of Aluminum Association alloy 2618 which has a composition of (0.1–0.25) Si -

(0.9–1.3) Fe - (1.9–2.7) Cu - (1.3–1.8) Mg - (0.9–1.2) Ni - 0.1 Zn - (0.04–0.1) Ti. The modified alloy adds scandium and zirconium to alloy 2618 to obtain enhanced properties. This new alloy generally comprises about (0.1–0.25) Si - (0.5–1.7) Fe - (1.5–3.1) Cu - (1.0–2.1) Mg - (0.6–1.5) Ni - (0.04–0.1) Ti - (0.02–10.0) Sc - (0.1–1.0) Zr. In one embodiment, the scandium content more preferably ranges from about 0.1 to about 0.5, and even more preferably from about 0.2 to about 0.4, weight percent. Moreover, the zirconium content more preferably ranges from about 0.05 to about 0.22, weight percent. The weight ratio of the scandium to the zirconium preferably ranges from about 1000:1 to about 0.02:1, and more preferably is about 3:1. In another embodiment, the alloy includes about 0.1–1.5 combined weight percent of one or more grain refiners (e.g., Ti, Zr, Cr, Mn, V, Yt, Nb, B, TiB$_2$, and Hf). In its most-preferred embodiment, the alloy consists essentially of about 0.18 Si - 1.1 Fe - 2.3 Cu - 1.6 Mg - 1.0 Ni - 0.40 Sc - (0.2–0.5) grain refiners, and the remainder consisting essentially of aluminum and incidental impurities.

Another alloy suitable for use in products/methodologies disclosed herein is a modification of Aluminum Association alloy 6061 which has a composition of (0.4–0.8) Si - 0.7 Fe - (0.15–0.4) Cu - 0.15 Mn - (0.8–1.2) Mg - (0.04–0.35) Cr - 0.25 Zn - 0.15 Ti. The modified alloy essentially removes chromium from the 6061 alloy and adds scandium in its place to obtain enhanced properties. This alloy generally comprises about (0.2–1.8) Si - (0.2–0.8) Mn - (0.4–1.4) Mg - (0.02–10.0) Sc, and is substantially free of chromium. In one embodiment, the scandium content more preferably ranges from about 0.1 to about 0.5, and even more preferably from about 0.2 to about 0.4, weight percent. In another embodiment, the alloy further comprises zirconium, preferably in the range of about 0.01 to about 1.0, and more preferably about 0.05 to about 0.22, weight percent. The weight ratio of the scandium to the zirconium preferably ranges from about 1000:1 to about 0.02:1, and more preferably is about 3:1. In another embodiment, the alloy includes about 0.1–1.5 combined weight percent of one or more grain refiners, not including chromium. In its most-preferred embodiment, the alloy consists essentially of about 0.6 Si - 1.0 Mg - 0.4 Sc - (0.2–0.5) grain refiners, and the remainder consisting essentially of aluminum and incidental impurities. Copper may also be provided in an amount of about 0.1 to 0.4 weight percent, preferably about 0.3 weight percent.

Another alloy suitable for use in products/methodologies disclosed herein is a modification of Aluminum Association alloy 7075 which has a composition of 0.4 Si - 0.5 Fe (Si+Fe are impurities) - (1.2–2.0) Cu - 0.3 Mn - (2.1–2.9) Mg - (0.18–0.28) Cr - (5.1–6.1) Zn - 0.2 Ti. The modified alloy essentially removes chromium from the 7075 alloy and adds scandium in its place to obtain enhanced properties. This new alloy generally comprises about (4.0–9.0) Zn - (0.6–3.8) Mg - (0.1–3.0) Cu - (0.02–10.0) Sc - (0.01–1.0) Zr, and is substantially free of chromium. In one embodiment, the scandium content more preferably ranges from about 0.1 to about 0.5, and even more preferably from about 0.2 to about 0.4, weight percent. In another embodiment, the alloy further comprises zirconium, preferably in the range of about 0.01 to about 1.0 and more preferably about 0.05 to about 0.22, weight percent. The weight ratio of the scandium to the zirconium preferably ranges from about 1000:1 to about 0.02:1, and more preferably is about 3:1. In another embodiment, the alloy includes about 0.1–1.5 combined weight percent of one or more grain refiners, not including chromium. In its most-preferred embodiment, the alloy consists essentially of about 5.6 Zn - 2.5 Mg - 1.6 Cu - 0.40 Sc - (0.2–0.5) grain refiners, and the remainder consisting essentially of aluminum and incidental impurities.

Another alloy suitable for use in products/methodologies disclosed herein is a modification of Aluminum Association alloy 2195 which has a composition of 4.0 Cu - 0.4 Mg - 1.0 Li - 0.4 Ag - 0.14 Zr. The modified alloy takes advantage of the presence of zirconium in the 2195 alloy and adds scandium to obtain enhanced properties. This new alloy generally comprises about (3.5–5.5) Cu - (0.01–1.5) Mg - (0.4–2.0) Li - (0.01–0.8) Ag - (0.02–0.5) Sc - (0.01–1.0) Zr, and is substantially free of zinc. In one embodiment, the scandium content more preferably ranges from about 0.1 to about 0.5, and even more preferably from about 0.2 to about 0.4, weight percent. Moreover, the zirconium content more preferably ranges from about 0.05 to about 0.22, weight percent. The weight ratio of the scandium to the zirconium preferably ranges from about 1000:1 to about 0.02:1, and more preferably is about 3:1. In one embodiment, the alloy includes about 0.1–1.5 combined weight percent of one or more grain refiners. In its most-preferred embodiment, the alloy consists essentially of about 4.0 Cu - 0.4 Mg - 1.0 Li - 0.4 Ag - 0.4 Sc - (0.2–0.5) grain refiners, and the remainder consisting essentially of aluminum and incidental impurities.

Another alloy suitable for use in products/methodologies disclosed herein is a modification of Aluminum Association alloy 2020 which has a composition of 4.5 Cu - 1.1 Li - 0.5 Mn - 0.2 Cd. The modified alloy of the present invention essentially removes cadmium from the 2020 alloy and adds scandium in its place to obtain enhanced properties. This new alloy generally comprises about (3.0–6.0) Cu - (0.4–1.8) Li - (0.1–0.7) Mn - (0.02–10.0) Sc - (0.01–1.0) Zr. In one embodiment, the scandium content more preferably ranges from about 0.1 to about 0.5, and even more preferably from about 0.2 to about 0.4, weight percent. In another embodiment, the alloy further comprises zirconium, preferably in the range of about 0.01 to about 1.0, and more preferably about 0.05 to about 0.22, weight percent. The weight ratio of the scandium to the zirconium preferably ranges from about 1000:1 to about 0.02:1, and more preferably is about 3:1. In one embodiment, the alloy includes about 0.1–1.5 combined weight percent of one or more grain refiners. In its most-preferred embodiment, the alloy consists essentially of about 4.0 Cu - 1.0 Li - 0.4 Sc - (0.2–0.5) grain refiners, and the remainder consisting essentially of aluminum.

Another alloy which is particularly useful as a filler alloy is a modification of Aluminum Association alloy 2319 which has a composition of 0.2 Si - 0.3 Fe - (5.8–6.8) Cu - (0.2–0.4) Mn - 0.02 Mg - 0.1 Zn - (0.05–0.15) V - (0.1–0.25) Zr - (0.1–0.2) Ti. The modified alloy essentially adds scandium to the 2319 alloy to obtain enhanced properties. This new alloy generally comprises about (2.0–10.0) Cu - (0.02–10.0) Sc. In one embodiment, the scandium content more preferably ranges from about 0.1 to about 0.5, and even more preferably from about 0.2 to about 0.4, weight percent. In another embodiment, this new alloy further comprises zirconium, preferably in the range of from about 0.01 to about 1.0, and more preferably from about 0.05 to about 0.22, weight percent. In yet another embodiment, the new alloy includes about 0.1–1.5 combined weight percent of one or more grain refiners. In its most preferred embodiment, the alloy consists essentially of about 6.0 Cu - 0.5 Sc - (0.2–0.8) grain refiners, and the remainder consisting essentially of aluminum and incidental impurities.

Another alloy is also particularly useful as a filler alloy and is a modification of Aluminum Association alloy 5356 which has a composition of 0.25 Si - 0.4 Fe - 0.1 Cu - (0.05–0.2) Mn - (4.5–5.5) Mg - (0.05–0.2) Cr - 0.1 Zn - (0.06–0.2) Ti. The modified alloy essentially adds scandium to the 5356 alloy while removing Cr to obtain enhanced properties. This new alloy generally comprises about (2.7–6.0) Mg - (0.02–10.0) Sc. In one embodiment, the scandium content more preferably ranges from about 0.1 to about 0.5, and even more preferably from about 0.2 to about 0.4, weight percent. In another embodiment, the alloy further comprises zirconium, preferably in the range of from about 0.01 to about 1.0, and more preferably from about 0.05 to about 0.22, weight percent. In another embodiment, the alloy further comprises titanium, preferably in the range of from about 0.01 to about 0.2, and more preferably about 0.15, weight percent. In another embodiment, the alloy comprises manganese, preferably in the range of from about 0.01 to about 0.7, weight percent. In yet another embodiment, the new alloy includes about 0.1–1.5 combined weight percent of one or more grain refiners. In its most-preferred embodiment, the alloy consists essentially of about 5.0 Mg - 0.5 Sc - (0.2–0.8) grain refiners, and the remainder consisting essentially of aluminum and incidental impurities.

Another alloy is directed to a novel alloy which is particularly useful as a filler alloy and is a modification of Aluminum Association alloy 4043 which has a composition of (4.5–6.0) Si - 0.8 Fe - 0.3 Cu - 0.05 Mn - 0.05 Mg - 0.1 Zn 0.2 Ti. The new alloy essentially adds scandium to the 4043 alloy to obtain enhanced properties. The new alloy generally comprises about (3.0–15.0) Si - (0.02–10.0) Sc. In one embodiment, the scandium content ranges from about 0.1 to about 0.5, and preferably from about 0.2 to about 0.4, weight percent. In another embodiment, the alloy further comprises titanium, preferably in the range of from about 0.01 to about 2.0, weight percent. In yet another embodiment, the new alloy includes about 0.1–1.5 combined weight percent of one or more grain refiners. In addition, the alloy may comprise 0.01–0.8 weight percent beryllium. In its most-preferred embodiment, the alloy consists essentially of about 5.3 Mg - 0.5 Sc - (0.2–0.8) grain refiners, and the remainder consisting essentially of aluminum and incidental impurities.

EXAMPLE 1

Six specimens (representing two different alloys) were tested for weldability utilizing the "Patch Test." In the Patch Test, a circular weld is produced on the surface of the alloy without utilizing filler material. After cooling, the alloy is inspected for cracks. The length of all of the cracks are added together to obtain the "Total Crack Length" ("TCL") of the alloy. The TCLs of different alloys can be compared and are typically indicative of the relative weldability of the alloys.

In the present example, the six specimens included three specimens of 6061 alloy and three specimens of a modification of the 6061 alloy ("M6061"). The compositions of the alloys are set forth in Table 1.

TABLE 1

| Alloy | Al | Si | Fe | Cu | Mn | Mg | Cr | Sc | Zr |
|-------|----|----|----|----|----|----|----|----|----|
| 6061  | *  | 0.618 | 0.469 | 0.272 | 0.276 | 0.979 | 0.208 | — | — |
| M6061 | *  | 0.650 | 0.559 | 0.270 | 0.272 | 1.023 | 0.009 | 0.40 | 0.12 |

*balance

In the present Patch Test, the weld electrode ran a current of 80 amps and a voltage of 12 volts. The travel speed of the electrode was 10 inches/minute and the diameter of the weld was 2.0 inches. The specimens were each 0.156 inches thick.

The data generated from the foregoing Patch Test is illustrated in Table 2. As can be seen from Table 2, the TCLs of the 6061 specimens ranged from 31.8 mm to 43.4 mm. In stark contrast, the TCLs of the M6061 specimens were zero for all specimens. These results indicate that the replacement of chromium with scandium and zirconium dramatically improves weldability. This is an extremely surprising result, especially given the fact that alloy 6061 is historically extremely hot crack sensitive compared to other aluminum alloys.

TABLE 2

| ALLOY | TOTAL CRACK LENGTH |
|-------|--------------------|
| 6061-1 | 31.8 |
| 6061-2 | 36.6 |
| 6061-3 | 43.4 |
| M6061-1 | 0.0 |
| M6061-2 | 0.0 |
| M6061-3 | 0.0 |

EXAMPLE 2

Eight filler alloy specimens were tested for weld properties and compared to published data for 2319 filler alloy. The filler alloys were used to weld a 2014 base alloy metal, and the resulting welds were tested for Ultimate Tensile Strength ("UTS"), Yield Strength ("YS") and Elongation.

The specimens included modifications of the 2319 filler alloy in accordance with the above. The compositions of each alloy and the test results are set forth in Table 3.

TABLE 3

| Filler Alloy Composition (weight percent) | Ultimate Tensile Strength, ksi | Yield Strength, ksi | % Elongation (in 1.5 inches) |
|---|---|---|---|
| Al-6.3 Cu-0.30 Mn-0.15 Ti-0.17 Zr-0.10 V (2319) (published) | 35.0 | 28.0 | 5.0 |
| (1) Al-5.0 Cu-0.37 Sc* | 49.6 (42) | 34.5 (23) | 6.7 (34) |
| (2) Al-2.60 Cu-0.16 Sc-0.19 Zr* | 48.6 (39) | 34.2 (22) | 5.7 (14) |
| (3) Al-5.20 Cu-0.36 Sc-0.20 Zr* | 49.1 (40) | 35.2 (26) | 5.4 (8) |
| (4) Al-3.08 Cu-0.17 Sc-0.19 Zr | 46.5 (33) | 33.1 (18) | 4.7 (−6) |
| (5) Al-5.20 Cu-0.17 Sc-0.10 Mn | 46.9 (34) | 35.1 (25) | 4.0 (−20) |
| (6) Al-4.50 Cu-0.15 Sc-0.10 Ti | 46.7 (33) | 34.8 (24) | 4.0 (−20) |
| (7) Al-5.10 Cu-0.15 Sc-0.03 Hf | 47.6 (36) | 34.8 (24) | 4.7 (−6) |
| (8) Al-2.30 Cu-0.40 Sc-0.20 Zr | 45.8 (31) | 35.9 (28) | 5.0 (0) |

*Failure occurred in the parent metal instead of the weldment
Number in parenthesis indicates the % improvement over 2319 filler alloy The welding operation was performed by hand at a current of 90–120 amps and a voltage of 12 volts.

As can be seen from comparing the data from specimen 1 to the published data for 2319 alloy, the removal of grain refiners (e.g., Mn, Ti, Zr and V) from 2319 and the substitution of scandium therefor resulted in a 42% increase in UTS, a 23% increase in YS, and a 34% increase in elongation. Data from specimens 2 and 3 indicate similar trends for the addition of scandium and zirconium in place of the grain refiners. It should be noted that, during the UTS test, the failures of alloys 1, 2 and 3 occurred in the parent metal instead of the weldment. Accordingly, the UTS for those welds are even higher than the values given in Table 3.

Specimens 4–7 showed improvements in UTS and YS, but showed a decrease in elongation compared to 2310 filler alloy. Specimen 8 showed increases in UTS and YS, but showed no change in elongation.

EXAMPLE 3

Eighteen aluminum alloy specimens, representing six different alloys (three specimens per alloy), were tested for Ultimate Tensile Strength ("UTS"), Yield Strength ("YS") and Elongation.

In the present example, the six alloys included: 7075, 6061, 2618, and modifications of each of these alloys in accordance with the above (M7075, M6061 and M2618). The weight percent compositions of the specimens tested are set forth in Table 4. The averages of the UTS, YS and Elongation for the three specimens of each alloy are set forth in Table 5.

TABLE 4

| Alloy | Si | Fe | Cu | Mn | Mg | Cr | Ni | Zn | Ti | Zr | Sc |
|-------|------|-------|-------|------|-------|------|-------|-------|------|-----|-----|
| 7075  | .025 | 0.28  | 1.611 | .004 | 2.556 | .221 |       | 5.609 |      |     |     |
| M7075 | .066 | .040  | 1.575 | .004 | 2.613 | .009 |       | 5.703 |      | .11 | .40 |
| 6061  | .618 | .469  | .272  | .276 | .979  | .208 |       |       | .001 |     |     |
| M6061 | .650 | .559  | .270  | .272 | 1.023 | .009 |       |       | .001 | .12 | .40 |
| 2618  | .147 | 1.116 | 2.314 | .006 | 1.675 | .001 | 1.158 |       | .081 |     |     |
| M2618 | .222 | 1.129 | 2.349 | .005 | 1.572 | .001 | 1.327 |       | .082 | .12 | .40 |

TABLE 5

|  | UTS | YS | % Elong. |
|---|---|---|---|
| 7075 | 84.4 | 74.3 | 10.7 |
| M7075 | 82.5 | 73.4 | 12.0 |
| aged @ 120° C. for 18 h | | | |
| 2618 | 50.2 | 57.4 | 13.0 |
| M2618 | 53.4 | 62.9 | 9.0 |
| aged @ 200° C. for 20 h | | | |
| 6061 | 35.1 | 30.7 | 19.0 |
| M6061 | 45.7 | 40.2 | 13.0 |
| aged @ 160° C. for 18 h | | | |

Referring to the data for alloys 7075 and M7075, it can be seen that the modification of alloy 7075 by removing chromium and adding scandium and zirconium resulted in a minor loss in a strength and approximately a 10% increase in elongation. It is believed that, upon optimization of heat treatment, the UTS and YS of the M7075 alloy will outperform the 7075 alloy.

The M2618 alloy showed a slight increase in UTS and YS and a loss in elongation compared to the 2618 alloy.

The most dramatic gains in strength were observed for the M6061 alloy. As can be seen from the data, significant gains were made in UTS and YS for the M6061 alloy compared to the 6061 alloy. Upon optimization of heat treatment, it is believed that further gains can be made.

Scandium additions to aluminum alloy systems have also been identified as a means for enhanced strength characteristics. However, known aluminum/scandium alloys also contain a wide range of dispersoid forming elements such as Cr, Mn, V, and Zr. Replacement of these conventional grain refining elements with Sc or a Sc+Zr grain refinement system and then implementing the new alloys into structural designs is believed to be advantageous. In addition to the documented tensile and compressive strength improvements of a Sc or Sc+Zr based wrought aluminum alloy system, many other property and processing characteristics that would be of interest to product designers seeking higher levels of performance, include improved 1) warm temperature strength, 2) strength in corrosion resistant overaged tempers, 3) weld strength and weldability, 4) fatigue and fracture toughness properties, 5) cold forming limits, 6) superplastic forming capability, 7) warm working characteristics, 8) resistance to recrystallization and 9) hot formability. Each of these characteristics are discussed in detail below.

Scandium containing intermetallic phases $Al_3Sc$ and $Al_3(Sc_xZr_{1-x})$ that form in an aluminum alloy can be exposed to elevated temperatures for long durations without hardness decreasing for up to 278 hours at a temperature of 350° C. (ref. Elagin, V. I. et al., Soviet Author Certificate UDK 669.715793). It is well known that most aluminum alloys will display a significant drop in strength after exposure to elevated temperatures greater than about 100° C. which is primarily due to coarsening of the strengthening precipitates. Accordingly, new compositions are disclosed herein that superimpose the thermal stability of Sc containing dispersoid particles with major alloying elements that provide solid solution strengthening and precipitation hardening. This alloying strategy is particularly useful for alloys such as 2219, 2519 and 2618 that are among the leading alloys for elevated temperature applications.

The 7XXX type alloys are usually overaged to improve stress corrosion and exfoliation corrosion resistance with a concomitant strength reduction. By removing elements that form incoherent particles such as Cr and Mn and substituting Sc and Zr, an elongated grain structure can be obtained after a hot working operation followed by solution heat treatment and quenching. Because an elongated grain structure is more resistant to intergranular stress corrosion cracking relative to a recrystallized or partially recrystallized microstructure, the modified 7XXX type alloys can be aged to higher strength levels without sacrificing favorable corrosion characteristics. Another potential approach is to overage the new alloy to equivalent strength levels to that of a conventional 7XXX alloy with improved corrosion performance.

As disclosed in U.S. patent application Ser. No. 08/249,023, Sc containing aluminum welding filler alloys used to weld Sc containing base metals result in improved weld strength and hot cracking resistance. Surprisingly, alloys that are traditionally considered to be non-weldable can be converted to weldable alloys using the principles of this teaching. This allows designers a whole new approach to designing welded structures since high strength alloys such as 7075 can now be considered.

Since most aerospace structures are designed using damage tolerance principles, fatigue and fracture toughness properties are always considered in design scenarios. The development of fine substructure in aluminum alloys with Sc or Sc+Zr will have a positive effect on these properties.

Another positive effect of an aluminum alloyed with Sc+Zr in place of V, Mn, Cr and Zr or combinations of these elements is the small grain size that is attained in the final wrought product. Because a significant portion of wrought aluminum alloys undergo a cold forming operation to achieve a final shape, a fine grain size will be advantageous. Large grain aluminum alloys are susceptible to "orange peel" effects that can result in an unacceptable surface finish or creation of nucleation sites for cracks. Moreover, a fine grain size will tend to homogenize slip more effectively than an alloy with a large grain size since the slip band length across grains is reduced.

Fabrication of complex shapes that require extensive forming strains can be accomplished by using the method of superplastic forming. As divulged in U.S. Pat. No. 5,055,257, the thermal stability of the $Al_3Sc$ phase enabled an improvement in the superplastic strain rate that was one to two orders of magnitude over that previously achieved for a 5XXX alloy.

During experimentation with the alloy systems disclosed in this invention, it was discovered that complex alloys such as 7075 or Al-Cu-Li alloys are more susceptible to cracking during large rolling reductions than alloys that are designed using the principle of replacing the existing grain refiners with Sc or Sc+Zr. The alloys that are designed using this principle thereby offer improved hot working characteristics that are applicable to rolling, forging and extrusion. This enhanced hot forming capability can be exploited by producing larger extrusions or forgings that would otherwise require press forces that exceed the capacity of the extrusion or forging press.

Aluminum alloys that are cold rolled to thin gages have sufficient stored energy to overcome the grain boundary pinning effect of dispersoid particles so that recrystallization occurs during subsequent solution heat treatment. It is typical to observe a significant strength loss when recrystallization occurs. In contrast, the $Al_3Sc$ or $Al_3Sc_xZr_{1-x}$ particles exhibit high thermal stability. This thermal stability manifests itself by allowing the retention of a non-recrystallized structure. Strength loss is accordingly reduced or eliminated in the new alloy system.

In hot forming operations such as age forming or spin forming of domes, alloys with Sc+Zr are more resistant to recrystallization and grain growth that often occurs after warm working and then repeating the full heat treatment sequence. Consequently, the new alloy system will display improved forming characteristics and properties of the final product over that previously attained.

The specific alloy design approach to improve the properties and processing characteristics of alloys involves removal of conventional grain refining elements such as Ti, Mn, Cr, $TiB_2$ and V, and replacing these elements with Sc or Sc Zr in combination with at least one of the major aluminum alloying elements such as Zn, Cu, Mg, Li and Si. A broad range for Sc can be claimed from 0.02 to 10 weight percent, with the amount of Sc additions being proportional to the solidification rate, for example the solubility of Sc can be increased by using techniques such as rapid solidification. The equilibrium solid solubility of Sc in aluminum, however, has been reported at about 0.50 weight percent. For ingot metallurgy based wrought aluminum alloys a more practical range is 0.02 to 0.50 Sc. Most aluminum alloys with high solute levels will contain Sc additions of 0.05 to 0.30 weight percent, and most commonly, 0.20 weight percent. Alloying with Sc additions to this lower level will enable good mechanical properties and processing characteristics without the formation of coarse, Sc containing primary particles.

An exception to the rule of adding Sc levels of about 0.20 weight percent is the alloying of Sc into filler alloys that are superheated to temperatures well above the liquidus temperature of the filler alloy and then rapidly cooled during welding. In this instance, up to 1.0 weight percent Sc can be introduced although most filler alloys will have about 0.50 weight percent Sc. Unlike the wrought alloys which do not necessarily need the conventional grain refining elements with Sc+Zr, the filler alloys may contain these elements to provide further grain refinement during welding. The addition of Ti is particularly useful in this regard.

Zirconium can enhance the effect of Sc by forming a complex dispersoid phase that provides the beneficial property and processing characteristics previously discussed. Up to 2.0 weight percent Zr can be added using rapid solidification. Most alloys will contain 0.10 to 0.20 Zr, and most typically, 0.12 weight percent Zr. Filler alloys can contain up to 1.0 weight percent Zr, with a more practical range of 0.10 to 0.40 weight percent, and typically, 0.20 weight percent.

Other elements that behave similarly to Zr include Ti, Hf, Y, and lanthanide elements 57 through 71 on the periodic table such as Gd and Nd. We have observed that these elements are completely miscible in Sc according to binary phase diagrams. This factor seems to provide a positive effect on the $Al_3Sc$ phase in aluminum alloys. One approach we are pursuing is to determine if some of these elements allow for the reduction of Sc in the aluminum alloy to decrease the price of the final alloy. One or more of these elements can be added in the range of 0.05 to 2.0 weight percent. It should be noted that one potential avenue is to not include Zr in a given aluminum alloy and instead utilize one or more of the other aforementioned elements in combination with Sc.

The new wrought aluminum alloy systems are produced using conventional processing methods which include homogenization of the as-cast billet, warm working that can be followed by cold working, solution heat treatment, quenching, cold work to reduce the residual stress of the quench or to stimulate nucleation of strengthening precipitates and a final step that includes ambient or elevated temperature aging for high strength. In addition to the above, combinations of two and three step aging or combinations of aging with an intermediate warm or cold working step followed by additional aging can be employed.

By way of initial summary, adding scandium and/or zirconium to binary 2XXX, ternary 2XXX, elevated temperature 2XXX, 4XXX, 5XXX, 6XXX, high strength 7XXX, weldable 7XXX, Al-Cu-Li-Mg Cu-Li-Mg and Al-Mg-Li aluminum-based alloys improves one or more properties of the alloy, including tensile strength, compressive strength, elevated temperature strength and creep resistance, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics, extrudability, retention of an unrecrystallized microstructure after cold rolling and solution heat, and hot formability.

More specifically, it has been discovered that (0.02–10) Sc and/or (0.01–1) Zr may be added to binary 2XXX type alloys, ternary 2XXX type alloys and elevated temperature 2XXX type alloys to achieve one or more of the recited improvements in properties and processing. In particular, it has been found that such modified 2XXX type alloys, such as the above-described M2020 alloy, are especially suited for use in recreational products, such as bicycle components (handle bars, pedals, seat posts, handle bar stems, wheel rims, cranks, crank arms, handle bar extensions, brake mechanisms, spokes, bottle cages, racks, derailleurs, saddles, suspension forks), motorbike and motorbike components, and/or snowmobiles. The M2618 alloy is suitable for use in motorbike components and in snowmobiles. Due to the improved tensile strength, compressive strength, elevated temperature strength and creep resistance, fatigue strength, retention of an unrecrystallized microstructure after cold rolling and solution heat and hot formability of such modified 2XXX type alloys, using such modified 2XXX in components for recreational products allows for reduced thickness of the various above-noted bicycle components, which reduces the weight of the bicycle. Such weight reductions can increase the rider's speed. With regard to motorbikes and/or snowmobiles, using modified 2XXX alloys can reduce the gages of tanks, components and other portions of the frame, which results in a lighter weight motorbike and/or snowmobile.

Similarly, it has been found that 2XXX type alloys modified in accordance with the above may be used in a variety of aerospace structures. In particular, due to the improved tensile strength, compressive strength, elevated temperature strength and creep resistance, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics, extrudability, retention of an unrecrystallized microstructure after cold rolling and solution heat, and hot formability of such modified 2XXX type alloys, reduced gages of sheets of such modified 2XXX type alloys may be used for the lower wing skins, fuselage frames, fuselage skins, leading edges, propellers, engine structure and inlet ducts, supersonic transport skins, avionic equipment mountings and cases, and/or integrally stiffened extruded barrel panels on aircraft to reduce the weight of the aircraft while maintaining the load carrying capability of the component. Launch vehicle structures, such as propellant tanks, including domes, skirt structures, inner tank structures, and isogrid structures, and integrally stiffened extruded barrel panels, containing such modified 2XXX may reduce the gages of sheets, extrusions and/or plates, which can result in significant weight reductions while maintaining the load carrying capability of the specific structures.

2XXX type alloys modified in accordance with the above, such as M2618, M2020, and M2319, may also be used in ground transportation structures such as components for automobiles, trucks, trailers, trains, construction equipment and/or people movers, such as shuttle buses and monorails. Due to the improved tensile strength, compressive strength, elevated temperature strength and creep resistance, weld strength (especially when using a Sc containing filler alloy), fatigue strength, weldability (especially when using a Sc containing filler alloy), cold formability, superplastic forming characteristics, extrudability, retention of an unrecrystallized microstructure after cold rolling and solution heat and hot formability, components comprising such modified 2XXX may include bumpers, sheet products (body panels, hoods, doors, inner panels), seat frames, connecting rods, armor plates, suspension parts and mounting brackets and details. Such modified 2XXX type alloys may be used in order to reduce the gages and/or thickness and/or cross-sectional area of extrusion walls, stiffeners, sheets and/or components while maintaining performance in crash scenarios, for a number of cycles, and, for armor plates, performance in ballistic testing.

Addition of (0.02–10) Sc and/or (0.01–1) Zr to 6XXX type alloys may achieve one or more of the recited improvements in properties and processing. In particular, such modified 6XXX type alloys, such as the above-described M6061 alloy, are especially useful in certain recreational and athletic structures and products and in ground transportation structures. More specifically, due to improved tensile strength, compressive strength, fatigue strength and hot formability, such modified 6XXX type alloys are especially suited for use in recreational products, such as bicycle components (handle bars, pedals, seat posts, handle bar stems, wheel rims, cranks, crank arms, handle bar extensions, brake mechanisms, spokes, bottle cages, racks, derailleurs, saddles, suspension forks) and racquets (e.g., tennis, squash, badminton, racquetball, etc). In particular, using such modified 6XXX alloys in components for recreational products allows for reduced thickness of the various above-noted bicycle components, which reduces the weight of the bicycle, thereby potentially increasing the speed of the bicycle. In addition, thinner walled racquets may be fabricated with such modified 6XXX alloys, resulting in a lighter weight racquet, which can increase the velocity of a person's swing and therefore the ball.

Certain components for ground transportation structures in which such modified 6XXX type alloys may be used have also been identified. More specifically, due to improved tensile strength, compressive strength, stress corrosion resistance with equivalent strength, strength with equivalent stress corrosion resistance, weld strength (especially when using a Sc containing filler alloy), fatigue strength, weldability, especially when using a Sc containing filler alloy, cold formability, extrudability, retention of an unrecrystallized microstructure after cold rolling and solution heat treatment, and hot formability, automotive space frames, sheet products (body panels, hoods, doors, inner panels), seat frames and mounting brackets and details composed of such modified 6XXX type alloys, such as the above-described M6061 alloy, allow for reduced gages and/or thickness of the extrusion structures and components while maintaining performance in crash scenarios and load carrying capability and may also provide for reduced cross-sectional areas of brackets.

The addition of (0.02–10) Sc and/or (0.01–1) Zr to 7XXX type alloys has also been found to be particularly useful in certain recreational and athletic equipment, aerospace structures, ground transportation structures and marine structures. More specifically, due to the improved tensile strength, compressive strength, elevated temperature strength and creep resistance, stress corrosion resistance with equivalent strength, strength with equivalent stress corrosion resistance, weld strength, especially when using scandium containing filler alloy, fatigue strength, weldability, especially when using scandium containing filler alloy, cold formability, extrudability and retention of an unrecrystallized microstructure after cold rolling and solution heat, such modified high strength or weldable 7XXX type alloys, such as the above-described M7075 alloy, are especially suited for use in recreational products, such as baseball or softball bats, archery arrows, ski poles, hockey sticks, bicycle frames and components (handle bars, pedals, seat posts, handle bar stems, wheel rims, cranks, crank arms, handle bar extensions, brake mechanisms, spokes, bottle cages, racks, derailleurs, saddles, suspension forks), golf shafts, golf club heads, racquets (e.g., tennis, squash, badminton, racquetball, etc), athletic wheel chairs, tent poles, snow shoes, backpack frames, wind surfing frames, lacrosse sticks, sailboat masts and booms and/or javelins. In particular, using such modified 7XXX alloys in components for recreational products allows for reduced wall thicknesses and cross-sections, thinner-walled tubes, and/or reduced gages of sheet, extrusions and/or plates of the various above-noted products and components thereof, which reduces the weight of such recreational and athletic products while maintaining or improving performance characteristics, such as velocity, accuracy, stiffness, balance, durability, strength, stored energy, resistance to buckling, fatigue, corrosion and/or bending and/or decreasing the occurrence of weld joint failures. For example, it has been recognized that fabricating sail masts from such high strength modified 7XXX type alloys may improve the balance of the sailboat and improve racing speed while maintaining corrosive resistance in the marine environment. In addition, thinner walled racquets may be fabricated with such modified 7XXX alloys, resulting in a lighter weight racquet, which can increase the velocity of a person's swing. Similarly, thinner walled tubes may be fabricated from such modified 7XXX alloys for use in wheelchairs and bicycles while reducing weight of the structure and achieving sufficient durability in the tubes and joints.

According to the present invention, it has also been found that modified 7XXX type alloys, such as the above-described M7075 alloy, may be used in certain components for aerospace structures due to the improved tensile strength, compressive strength, elevated temperature strength and creep resistance, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics, extrudability, retention of an unrecrystallized microstructure after cold rolling and solution heat, and/or hot formability. Specifically, such modified 7XXX type alloys are particularly useful in aircraft components and structures, such as upper and lower wing skins, seat tracks, fuselage skins and frames, stringers, floor beams, cargo tracks, propellers, avionic equipment mountings and cases, and/or leading edges, and in launch vehicle components, such as propellant tanks, including domes, skirt structures, inner tank structures and/or isogrid structures. In addition, such modified 7XXX type alloys according to the present invention may be used to fabricate integrally stiffened extruded barrel panels for both aircraft and launch vehicles. Advantages to using such modified 7XXX include reducing the gages of sheets, extrusions and/or plates to save weight while maintaining load carrying capability, using thinner extrusion walls to reduce the weight of the seat tracks, changing the geometry of the stringer to take advantage of the improved properties, decrease the cross-sectional area to reduce weight of the structure and/or reducing the wall thickness to save weight while maintaining load carrying capability.

Similarly, it has been found that such modified 7XXX type alloys may be used in certain components for ground transportation structures due to improved tensile strength, compressive strength, elevated temperature strength and creep resistance, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics, extrudability, retention of an unrecrystallized microstructure after cold rolling and solution heat, and hot formability. More specifically, automotive space frames, bumpers, sheet products (body panels, hoods, doors, inner panels), seat frames, connecting rods, armor plates, liquid and cryogenic liquid transportation tanks, people movers (shuttle buses, monorails, etc.), suspension parts and mounting brackets and details composed of such modified 7XXX type alloys, such as the above-described M7075 alloy, allow for reduced gages and/or thicknesses of the sheets, walls and/or extrusion structures and components, and/or reduced cross-sectional area of suspension parts and brackets while maintaining performance in crash scenarios and/or load carrying capabilities, maintaining performance for a number of cycles, and/or maintaining safety from catastrophic failure.

Certain marine structures may also be fabricated from such modified 7XXX type alloys due to the improved tensile strength, compressive strength, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics and/or hot formability. In particular, such modified 7XXX type alloys, such as the above-described M7075 alloy, may be used in torpedo casings, sea launched missiles and naval fighter aircraft to reduce the thickness of walls while maintaining performance.

It has also been found that addition of (0.02–10) Sc and/or (0.01–1) Zr to 5XXX type alloys achieves one or more of the recited improvements in properties and processing and such modified 5XXX type alloys are especially suited for use in recreational products, aerospace structures, ground transportation structures and marine structures. In particular, it has been discovered that such modified 5XXX type alloys, such as the above-described M5356 alloy, are especially useful in bicycle components (e.g., handle bars, pedals, seat posts, handle bar stems, wheel rims, cranks, crank arms, handle bar extensions, brake mechanisms, spokes, bottle cages, racks, derailleurs, saddles, suspension forks), racquets (e.g., tennis, squash, badminton, racquetball, etc.), tent poles, snow shoes, backpack frames, wind surfing frames, sailboat masts and booms, motorbikes and components therefor, and snowmobiles. This is primarily due to improved tensile strength, compressive strength, elevated temperature strength and creep resistance, stress corrosion resistance with equivalent strength, strength with equivalent stress corrosion resistance, fatigue strength, weldability, especially when using scandium containing filler alloy, cold formability, extrudability, retention of an unrecrystallized microstructure after cold rolling and solution heat, and/or hot formability. In this regard, bicycles components of reduced thickness may be fabricated from such modified 5XXX type alloys to reduce bicycle weight and increase the rider's speed. Similarly, thinner or reduced gages for walls and/or tubes may be fabricated from such modified 5XXX type alloys while improving performance characteristics of the product, such as weight, velocity, durability, strength, balance and/or resistance to buckling and/or corrosion.

It has also been discovered that such modified 5XXX type alloys, such as the above-described M5356 alloy, are particularly suited to use in certain aerospace structures, namely, lower wing skins and integrally stiffened extruded barrel panels for both aircraft and launch vehicles, and in other launch vehicle components (e.g., skirt structures, isogrid structures). This may be attributed to improved tensile strength, compressive strength, stress corrosion resistance with equivalent strength, strength with equivalent stress corrosion resistance, weld strength (especially when using a Sc containing filler alloy), fatigue strength, weldability, especially when using scandium containing filler alloy, cold formability, superplastic forming characteristics, extrudability, retention of an unrecrystallized microstructure after cold rolling and solution heat and/or hot formability. Wall thickness of and/or gages of sheet, extrusions and/or plates may be reduced where such modified 5XXX type alloys are used. As a result, the weight of the structure is reduced while maintaining load carrying capability.

Certain ground transportation structures have been identified in which such modified 5XXX type alloys, such as the above-described M5356 alloy, may be used. Specifically, such modified 5XXX type alloys may be used in automotive space frames, bumpers, sheet products (e.g., body panels, hoods, doors, inner panels), seat frames, liquid and cryogenic liquid transportation tanks, people movers (shuttle buses, monorails, etc.), suspension parts and/or mounting brackets and details due to the improved tensile strength, compressive strength, stress corrosion resistance with equivalent strength, strength with equivalent stress corrosion resistance, weld strength (especially when using a Sc containing filler alloy), fatigue strength, weldability (especially when using scandium containing filler alloy), cold formability, superplastic forming characteristics, extrudability, retention of an unrecrystallized microstructure after cold rolling and solution heat and/or hot formability of such modified 5XXX type alloys. In particular, for such ground transportation structures fabricated from such modified 5XXX type alloys, gages of the extrusion walls, thicknesses of the sheets, frames and components and/or cross-sectional areas of components may be reduced while maintaining performance in crashing scenarios and while maintaining load carrying capability.

Certain marine structures composed of such modified 5XXX type alloys were also identified. Specifically, such modified 5XXX type alloys, such as the above-described M5356 alloy, have been found to be especially useful in canoes and kayaks, torpedo casings, scuba diving tanks, sea launched missiles, naval fighter aircraft, ferries, yachts and recreational boats as such modified 5XXX type alloys exhibit improved tensile strength, compressive strength, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics, retention of an unrecrystallized microstructure after cold rolling and solution heat, and/or hot formability. By utilizing such modified 5XXX type alloys in these marine structures, wall thickness of such structures and components may be reduced while maintaining performance. In addition, with regard to ferries, yachts and recreational boats, plate and sheet gages may be reduced and components in the structure and engine may be decreased in size while maintaining performance characteristics.

It has also been found that addition of (0.02–10) Sc and/or (0.01–1) Zr to 4XXX type alloys achieves one or more of the recited improvements in properties and processing and such modified 4XXX type alloys are especially suited for use in athletic and recreational products, ground transportation structures and marine structures. In particular, it has been discovered that such modified 4XXX type alloys, such as the above-described M4043 alloy, are especially useful in motorbike components and snowmobiles due to improved tensile strength, compressive strength, elevated temperature strength and creep resistance, fatigue strength, weldability (especially when using a Sc containing filler alloy). These enhanced properties may be exploited by reducing gages of motorcycle components.

In addition, certain ground transportation structures have been identified in which modified 4XXX type alloys are well suited due to its improved tensile strength, compressive strength, elevated temperature strength and creep resistance, fatigue strength, weldability, especially when using scandium containing filler alloy, extrudability and/or hot formability. Specifically, structures of such modified 4XXX type alloys, such as the above-described M4043 alloy, are particularly useful in people movers (e.g., shuttle buses, monorails, etc.), transmission housings, pistons and cylinder heads. By using such modified 4XXX type alloys, one or more of the above-listed improved properties and processing may be exploited by reducing the gages of components and major portions of the vehicle body or by reducing the wall thickness of transmission housings. Similarly, the size of the cylinder heads and the pistons may also be reduced due to the improved properties and processing.

It has also been found that addition of (0.02–10) Sc and/or (0.01–1) Zr to Al- (2.0–7.0) Cu - (0.20–2.5) Li - (0.05–0.30) Mg alloys achieves one or more of the recited improvements in properties and processing and such modified Al-Cu-Li-Mg alloys are especially suited for use in recreational products, aerospace structures, ground transportation structures and marine structures. In particular, we discovered that due to improved tensile strength, compressive strength, stress corrosion resistance with equivalent strength, strength with equivalent stress corrosion resistance, weld strength, especially when using scandium containing filler alloy, fatigue strength, weldability, especially when using scandium containing filler alloy, cold formability, extrudability, retention of an unrecrystallized microstructure after cold rolling and solution heat, and/or hot formability, modified Al-Cu-Li-Mg alloys, such as the above-described M2195 alloy, are especially useful in recreational structures such as archery arrows, hockey sticks, bicycle frames, bicycle components (e.g., handle bars, pedals, seat posts, handle bar stems, wheel rims, cranks, crank arms, handle bar extensions, brake mechanisms, spokes, bottle cages, racks, derailleurs, saddles, suspension forks), golf shafts, golf club heads, racquets (e.g., tennis, squash, badminton, racquetball), athletic wheel chairs, tent poles, snow shoes, backpack frames, lacrosse sticks and javelins. In this regard, thin gages may be used to obtain high strength products, such as archery arrows, and wall thicknesses may be reduced while reducing weight of the component or product and while increasing stiffness, durability in the tubes and joints, resistance to buckling, and/or bending resistance.

It has also been discovered that modified Al-Cu-Li-Mg alloys, such as M2195, are also useful in aerospace structures due to the improved tensile strength, compressive strength, elevated temperature strength and creep resistance, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics, extrudability, retention of an unrecrystallized microstructure after cold rolling and solution heat and/or hot formability. In particular, such modified Al-Cu-Li-Mg alloys have been found to be useful in aircraft components such as upper wing skins, seat tracks, fuselage frames and skins, stringers, floor beams, cargo tracks, leading edges, propellers, engine structures and inlet ducts, supersonic transport skins, avionic equipment mountings and cases and integrally stiffened extruded barrel panels, and in launch vehicle components, such as propellant tanks, including domes, skirt structures, inner tank structures, isogrid structures and integrally stiffened extruded barrel panels. Due to the enhanced properties and processing of such modified Al-Cu-Li-Mg alloys, weight of the structures may be reduced by reducing gages of sheets, cross-sectional areas, plates and extrusions and thicknesses of walls while maintaining load carrying capability.

It has also been discovered that modified Al-Cu-Li-Mg alloys, such as M2195, are particularly useful in ground transportation structures due to the improved tensile strength, compressive strength, elevated temperature strength and creep resistance, stress weld strength, especially when using scandium containing filler alloy, fatigue strength, fracture toughness, weldability, especially when using scandium containing filler alloy, extrudability and/or hot formability. Specifically, such modified Al-Cu-Li-Mg alloys have been identified as especially useful in connecting rods and armor plating as the thickness of the structure may be reduced while maintaining performance characteristics for a number of cycles and in ballistic testing, respectively.

It has also been recognized that such modified Al-Cu-Li-Mg alloys are also suited for use in certain marine structures due to the improved tensile strength, compressive strength, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics and/or hot formability. Specifically, such modified Ai-Cu-Li-Mg alloys may be used in naval fighter aircraft to reduce the thickness of structural components while maintaining performance.

It has also been found that addition of (0.02–10) Sc and/or (0.01–1) Zr to Al-Li-Mg alloys achieves one or more of the recited improvements in properties and processing. Preferably, such modified Al-Li-Mg alloys are composed of (2.0–8.0) Mg - (0.20–2.5) Li - (0.05–0.60) Sc - (0.05–0.30) Zr with the remainder including aluminum. Such modified Al-Li-Mg alloys are especially suited for use in recreational products, aerospace structures and marine structures. In particular, it was discovered that due to improved tensile strength, compressive strength, elevated temperature strength and creep resistance, stress corrosion resistance with equivalent strength, strength with equivalent stress corrosion resistance, weld strength, especially when using scandium containing filler alloy, fatigue strength, weldability, especially when using scandium containing filler alloy, cold formability, extrudability, retention of an unrecrystallized microstructure after cold rolling and solution heat, and/or hot formability, such modified Al-Li-Mg alloys are especially useful in recreational structures such as ski poles, hockey sticks, bicycle frames, bicycle components (e.g., handle bars, pedals, seat posts, handle bar stems, wheel rims, cranks, crank arms, handle bar extensions, brake mechanisms, spokes, bottle cages, racks, derailleurs, saddles, suspension forks), racquets (e.g., tennis, squash, badminton, racquetball), athletic wheel chairs, tent poles, snow shoes, backpack frames, wind surfing frames, javelins, motorbikes and components thereof and/or snowmobiles. In this regard, gages of sheet and wall thicknesses may be reduced while reducing weight of the component or product and while increasing stiffness, durability in the tubes and joints, resistance to buckling, and/or bending resistance.

It has also been found that such modified Al-Li-Mg alloys are also useful in aerospace structures due to the improved tensile strength, compressive strength, stress corrosion resistance with equivalent strength, strength with equivalent stress corrosion resistance, weld strength, especially when using scandium containing filler alloy, fatigue strength, weldability, especially when using scandium containing filler alloy, cold formability, superplastic forming characteristics, retention of an unrecrystallized microstructure after cold rolling and solution heat and/or hot formability. In particular, such modified Al-Li-Mg alloys have been found to be useful in aircraft components such as upper wing skins, floor beams and integrally stiffened extruded barrel panels, and in launch vehicle components, such as propellant tanks, including domes, skirt structures, inner tank structures, isogrid structures and integrally stiffened extruded barrel panels. Due to the enhanced properties and processing of such modified Al-Li-Mg alloys, weight of the structures may be reduced by reducing gages of sheets, cross-sectional areas, plates and extrusions and thicknesses of walls while maintaining load carrying capability.

It has also been recognized that such modified Al-Li-Mg alloys are also suited for use in certain marine structures due to the improved tensile strength, compressive strength, stress corrosion resistance with equivalent strength, strength with equivalent stress corrosion resistance, weld strength, especially when using scandium containing filler alloy, fatigue strength, fracture toughness, weldability, especially when using scandium containing filler alloy, cold formability, superplastic forming characteristics, retention of an unrecrystallized microstructure after cold rolling and solution heat and/or hot formability. Specifically, such modified Al-Li-Mg alloys may be used in canoes and kayaks, torpedo casings, scuba diving tanks, sea launched missiles, naval fighter aircraft, ferries, yachts and recreational boats to reduce the thickness of walls, to decrease plate and sheet gages and to reduce the size of components in the structure and engine while maintaining performance.

More specific alloy systems will now be discussed herein. In one embodiment, a new alloy system may be characterized as a high strength 7XXX alloy system using the Aluminum Association classification system. In this embodiment, the alloy system comprises about (4.5–10) Zn, (1.0–3.5) Mg and (0.50–3.0) Cu. The grain refining system comprises (0.05–0.60) Sc and (0.05–0.30) Zr. It may be desirable to include elements that are miscible with Sc such as Y, Hf, Ti or Lanthanide elements in the range of 0.05 to 1.0 weight percent. Elements typically used for grain refinement in this alloy system such as Cr, V and Mn are effectively removed. Specific embodiments which utilize the alloy design principles include:

Al - 7.4 Zn - 3.0 Mg - 2.1 Cu - 0.20 Sc - 0.12 Zr

Al - 5.6 Zn - 2.5 Mg - 1.6 Cu - 0.20 Sc - 0.12 Zr

Al - 7.7 Zn - 2.4 Mg - 1.5 Cu - 0.20 Sc - 0.12 Zr

Al - 6.2 Zn - 2.3 Mg - 2.3 Cu - 0.20 Sc - 0.12 Zr

Al - 6.8 Zn - 2.7 Mg - 2.0 Cu - 0.20 Sc - 0.12 Zr

Al - 8.0 Zn - 2.1 Mg - 2.3 Cu - 0.20 Sc - 0.12 Zr

Many of these alloys simulate the Zn, Mg and Cu levels of conventional 7XXX alloys. Depending upon service requirements and design loads, the levels of Zn, Mg and Cu can be adjusted accordingly. It should be noted that Si and Fe should be minimized in this alloy system based on the adverse effect of these elements on fracture toughness. A total content of Fe+Si should be less than about 0.50 weight percent and preferably lower. Alloys of this system are advantageous for use in high performance athletic equipment, structures and components in aerospace or ground transportation systems.

In another embodiment, the new alloy system in accordance with the principles of the present invention is a weldable 7XXX alloy system using the Aluminum Association classification system. In this embodiment, the alloy system comprises about (4.5–10) Zn and (1.0–3.5) Mg. The grain refining system comprises (0.05–0.60) Sc and (0.05–0.30) Zr. It may be desirable to include elements that are miscible with Sc such as Y, Hf, Ti or Lanthanide elements in the range of 0.05 to 1.0 weight percent. Elements typically used for grain refinement in this alloy system such as Cr, V and Mn are effectively removed. Specific embodiments which utilize the alloy design principles include:

Al - 4.5 Zn - 1.5 Mg - 0.20 Sc - 0.12 Zr

Al - 4.0 Zn - 2.8 Mg - 0.20 Sc - 0.12 Zr

Al - 7.1 Zn - 1.3 Mg - 0.20 Sc - 0.12 Zr

Depending upon service requirements and design loads, the levels of Zn and Mg can be adjusted accordingly. Additions of Si and Fe should be minimized in this alloy system based on the adverse effect of these elements on fracture toughness. A total content of Fe+Si should be less than about 0.50 weight percent and preferably lower. Alloys of this system are advantageous for use in high performance athletic equipment, structures and components in aerospace or ground transportation systems.

In another embodiment, the new alloy system in accordance with the principles of the present invention is a binary Al-Cu 2XXX alloy system using the Aluminum Association classification system. In this embodiment, the alloy system comprises about (2.0–7.0) Cu. The grain refining system comprises (0.05–0.60) Sc and (0.05–0.30) Zr. It may be desirable to include elements that are miscible with Sc such as Y, Hf, Ti or Lanthanide elements in the range of 0.05 to 1.0 weight percent. Elements typically used for grain refinement in this alloy system such as V and Mn are effectively removed. Specific embodiments which utilize the alloy design principles include:

Al - 6.0 Cu - 0.20 Sc - 0.18 Zr

Al - 4.5 Cu - 0.20 Sc - 0.18 Zr

Al - 6.0 Cu - 0.50 Sc - 0.20 Zr - 0.15 Ti (welding filler alloy)

Elements such as Ag, Mg, Zn, Ge, Sn, Cd, In and Ca may be introduced singly or in combination with one another to serve as nucleation aids for strengthening precipitates and to modify the size and distribution of G.P. zones. The elements that assist nucleation of precipitates can be added in the range of 0.02 to 1.0 weight percent. Alloys in this category are advantageous in aerospace structures and some ground transportation systems.

In another embodiment, the new alloy system in accordance with the principles of the present invention is a ternary Al-Cu-Mg 2XXX alloy system using the Aluminum Association classification system. In this embodiment, the alloy system comprises about (2.0–7.0) Cu and (0.20–2.0) Mg. The grain refining system comprises (0.05–0.60) Sc and (0.05–0.30) Zr. It may be desirable to include elements that are miscible with Sc such as Y, Hg, Ti or Lanthanide elements in the range of 0.05 to 1.0 weight percent. Elements typically used for grain refinement in this alloy system such as V and Mn are effectively removed. Specific embodiments which utilize the alloy design principles include:

Al - 4.5 Cu - 0.50 Mg - 0.20 Sc - 0.18 Zr

Al - 5.5 Cu - 0.20 Mg - 0.20 Sc - 0.18 Zr

Al - 5.5 Cu - 0.40 Mg - 0.40 Ag - 0.20 Sc - 0.18 Zr

Al - 6.0 Cu - 0.30 Mg - 0.50 Sc - 0.20 Zr - 0.20 Ti (welding filler alloy)

Al - 4.3 Cu - 1.5 Mg - 0.20 Sc - 0.18 Zr

Elements such as Ag, Mg, Zn, Ge, Sn, Cd, In and Ca may be introduced singly or in combination with one another to serve as nucleation aids for strengthening precipitates and to modify the size and distribution of G.P. zones. The elements that assist nucleation of precipitates can be added in the range of 0.02 to 0.50 weight percent. The total Fe+Si content should be below about 0.50 weight percent. Alloys in this category are advantageous in athletic equipment, aerospace structures and some ground transportation systems.

In another embodiment, the new alloy system in accordance with the principles of the present invention is an elevated temperature 2XXX alloy system using the Aluminum Association classification system. In this embodiment, the alloy system comprises about (2.0–7.0) Cu and (0.20–2.0) Mg. Additions of Fe and Ni can be made in ranges of 0.50 to 1.5 weight percent each when it is desirable to provide intermetallic phases with high melting point. The grain refining system comprises (0.05–0.60) Sc and (0.05–0.30) Zr. It may be desirable to include elements that are miscible with Sc such as Y, Hf, Ti or Lanthanide elements in the range of 0.05 to 1.0 weight percent. Elements typically used for grain refinement in this alloy system such as V and Mn are effectively removed. Specific embodiments which utilize the alloy design principles include:

Al - 4.5 Cu - 0.50 Mg - 0.20 Sc - 0.18 Zr

Al - 4.5 Cu - 0.50 Mg - 0.20 Sc - 0.18 Zr - 1.0 Ni - 1.0 Fe

Al - 5.5 Cu - 0.50 Mg - 0.20 Sc - 0.18 Zr - 0.40 Ag

Al - 2.5 Cu - 1.5 Mg - 0.20 Sc - 0.18 Zr - 1.0 Ni - 1.0 Fe

Al - 3.5 Cu - 1.5 Mg - 0.20 Sc - 0.18 Zr - 0.50 Ni - 0.50 Fe

Elements such as Ag, Zn, Ge, Sn, Cd, In and Ca may be introduced singly or in combination with one another to serve as nucleation aids for strengthening precipitates and to modify the size and distribution of G.P. zones. The elements that assist nucleation of precipitates can be added in the range of 0.02 to 0.50 weight percent. The total Fe+Si content should be below about 0.50 weight percent for alloys in which Fe additions are not made. Alloys in this category are advantageous in aerospace structures that are subjected to elevated temperatures and engine components in ground transportation systems, including recreational ground transportation systems such as motorcycles.

In another embodiment, the new alloy system in accordance with the principles of the present invention is an Al-Cu-Li-Mg alloy system that can be classified as a 2XXX or 8XXX alloy using the Aluminum Association classification system. In this embodiment, the alloy system comprises about (2.0–7.0) Cu, (0.20–2.5) Li and (0.05–2.0) Mg. The grain refining system comprises (0.05–0.60) Sc and (0.05–0.30) Zr. It may be desirable to include elements that are miscible with Sc such as Y, Hf, Ti or Lanthanide elements in the range of 0.05 to 1.0 weight percent. Specific embodiments which utilize the alloy design principles include:

Al - 4.0 Cu - 0.80 Li - 0.40 Mg - 0.20 Sc - 0.14 Zr

Al - 4.0 Cu - 1.0 Li - 0.40 Mg - 0.20 Sc - 0.14 Zr

Al - 4.5 Cu - 0.50 Li - 0.40 Mg - 0.20 Sc - 0.14 Zr

Al - 3.0 Cu - 2.0 Li - 0.40 Mg - 0.20 Sc - 0.14 Zr

Al - 2.5 Cu - 2.0 Li - 0.40 Mg - 0.20 Sc - 0.14 Zr

Al - 4.0 Cu - 0.80 Li - 0.40 Mg - 0.20 Sc - 0.14 Zr

Al - 4.0 Cu - 1.0 Li - 0.20 Sc - 0.14 Zr - 0.12 Y

Al - 1.3 Cu - 2.5 Li - 1.0 Mg - 0.20 Sc - 0.14 Zr

Elements such as Zn, Ge, Sn, Cd, In and Ca may be introduced singly or in combination with one another to serve as nucleation aids for strengthening precipitates and to modify the size and distribution of G.P. zones. The elements that assist nucleation of precipitates can be added in the range of 0.02 to 0.50 weight percent. The total Fe+Si content should be below about 0.50 weight percent. Alloys in this category are advantageous in high end athletic equipment and aerospace structures.

In another embodiment, the new alloy system in accordance with the principles of the present invention is an Al-Mg-Li alloy system that can be classified as a 5XXX alloy using the Aluminum Association classification system. In this embodiment, the alloy system comprises about (2.0–8.0) Mg and (0.50–2.5) Li. The grain refining system comprises (0.05–0.60) Sc and (0.05–0.30) Zr. It may be desirable to include elements that are miscible with Sc such as Y, Hg, Ti or Lanthanide elements in the range of 0.05 to 1.0 weight percent. Specific embodiments which utilize the alloy design principles include:

Al - 5.5 Mg - 2.0 Li - 0.20 Sc - 0.12 Zr

Al - 6.0 Mg - 1.0 Li - 0.20 Sc - 0.12 Zr

Al - 6.0 Mg - 1.0 Li - 0.20 Sc - 0.12 Zr - 0.12 Y

Al - 6.0 Mg - 0.60 Li - 0.20 Sc - 0.12 Zr

Elements such as Ag, Zn, Ge, Sn, Cd, In and Ca may be introduced singly or in combination with one another to serve as a nucleation aids for strengthening precipitates and modify the size and distribution of G.P. zones. The elements that assist nucleation of precipitates can be added in the range of 0.02 to 0.50 weight percent. The total Fe+Si content should be below about 0.50 weight percent. Alloys in this category are advantageous in high end athletic equipment, aerospace structures and marine structures.

In another embodiment, the new alloy system in accordance with the principles of the present invention is an Al-Mg alloy system that can be classified as a 5XXX alloy using the Aluminum Association classification system. In this embodiment, the alloy system comprises about (1.0–10.0) Mg. The grain refining system comprises (0.05–0.60) Sc and (0.05– 0.30) Zr. It may be desirable to include elements that are miscible with Sc such as Y, Hf, Ti or Lanthanide elements in the range of 0.05 to 1.0 weight percent. Elements typically used for grain refinement in this alloy system such as Cr and Mn are effectively removed. Specific embodiments which utilize the alloy design principles include:

Al - 4.0 Mg - 0.20 Sc - 0.12 Zr

Al - 5.0 Mg - 0.20 Sc - 0.12 Zr

Al - 6.0 Mg - 0.20 Sc - 0.12 Zr

Al - 6.0 Mg - 0.20 Sc - 0.12 Zr - 0.12 Y

Al - 6.0 Mg - 0.50 Sc - 0.20 Zr - 0.15 Ti (welding filler alloy)

Al - 4.0 Mg - 2.2 Zn - 0.50 Sc - 0.20 Zr (welding filler alloy)

Al - 4.0 Mg - 2.2 Zn - 0.50 Sc - 0.20 Zr - 0.12 Y (welding filler alloy)

The total Fe+Si content should be below about 0.50 weight percent. Alloys in this category are advantageous in high end athletic equipment, aerospace structures, automotive components and marine structures.

In another embodiment, the new alloy system in accordance with the principles of the present invention is an Al-Si-Mg alloy system that can be classified as a 6XXX alloy using the Aluminum Association classification system. In this embodiment, the alloy system comprises about (0.10–2.0) Si and (0.60–1.5) Mg. The grain refining system comprises (0.05–0.60) Sc and (0.05–0.30) Zr. It may be desirable to include elements that are miscible with Sc such as Y, Hf, Ti or Lanthanide elements in the range of 0.05 to 1.0 weight percent. Elements typically used for grain refinement in this alloy system such as Cr and Mn are effectively removed. Specific embodiments which utilize the alloy design principles include:

Al - 0.60 Si - 1.0 Mg - 0.20 Sc - 0.12 Zr

Al - 0.60 Si - 1.0 Mg - 0.20 Sc - 0.12 Zr - 0.80 Cu

The total Fe content should be below about 0.50 weight percent. Alloys in this category are advantageous in athletic equipment, aerospace structures, automotive components and marine structures.

In another embodiment, the new alloy system in accordance with the principles of the present invention is an Al-Si alloy system that can be classified as a 4XXX alloy using the Aluminum Association classification system. In this embodiment, the alloy system comprises about (3.5–15.0) Si, (0.05–3.0) Mg and (0.05–1.5) Ni. The grain refining system comprises (0.05–0.60) Sc and (0.05–0.30) Zr. It may be desirable to include elements that are miscible with Sc such as Y, Hf, Ti or Lanthanide elements in the range of 0.05 to 1.0 weight percent. Elements typically used for grain refinement in this alloy system such as Cr and Mn are effectively removed. Specific embodiments which utilize the alloy design principles include:

Al - 12.0 Si - 1.0 Mg - 0.90 Ni - 0.20 Sc - 0.12 Zr

Al - 5.5 Si - 0.50 Sc - 0.20 Zr - 0.15 Ti (welding filler alloy)

The total Fe content should be below about 0.50 weight percent. Alloys in this category are advantageous in bearing applications in aerospace, automotive and marine engine components.

Specific athletic or recreational equipment that would benefit from many of the alloys disclosed include baseball or softball bats, archery arrows, ski poles, hockey sticks, bicycle frames, bicycle components (handle bars, pedals, seat posts, handle bar stems, wheel rims, cranks, crank arms, handlebar extensions, brake mechanisms, spokes, bottle cages, racks derailleurs, saddles, suspension forks), golf shafts, golf club heads, racquets (tennis, squash, badminton, racquetball, etc.), athletic wheel chairs, tent poles, snow shoes, backpack frames, wind surfing frames, lacrosse sticks, sailboat masts and booms, javelins, motorbikes, motorbike components, jetskis and snowmobiles.

Specific aerospace structures and components that would benefit from many of the alloys disclosed include aircraft upper wing skins, aircraft lower wing skins, aircraft seat tracks, aircraft fuselage skin, aircraft fuselage frames, aircraft stringers, aircraft floor beams, aircraft cargo tracks, aircraft leading edges, aircraft engine structure and inlet ducts, aircraft supersonic transport skins, launch vehicle propellant tanks domes, launch vehicle skirt structures, launch vehicle inner tank structures, launch vehicle isogrid structures and integrally stiffened extruded barrel panels for both aircraft and launch vehicles.

Specific ground transportation structures and components that would benefit from many of the alloys disclosed include automotive space frames, bumpers, sheet products, (body panels, hoods, doors, inner panels), seat frames, connecting rods, armor plate, liquid and cryogenic liquid transportation tanks, people movers (shuttle buses, monorails, etc.), suspension parts, mounting brackets and details, transmission housings, pistons and cylinder heads.

Specific marine structures and components that would benefit from many of the alloys disclosed include canoes and kayaks, torpedo casings, scuba diving tanks, sea launched missiles, naval fighter aircraft, ferries, yachts and recreational boats.

Specific examples are given to demonstrate how the new alloy system can attain unique properties and processing characteristics that change the way designers approach product design and manufacturing.

EXAMPLE 1

Modern bicycles and mountain bikes in particular have evolved into very high technology structures. High end mountain bicycles used by serious riders consist of welded frames using aluminum or titanium alloy tubing. Several components that are integrated into a bicycle are often machined using computerized numerical control methods for precision. With regard to targeting a portion of the bicycle where weight reduction can be made, it is clear that the frame is the leading contributor to the total metallic weight of the bicycle.

Despite the technological improvements that have been introduced into bicycles, the aluminum alloys that are now used for the frame portion include relatively low strength alloys 6061 (yield strength=40 ksi) and 7005 (yield strength=42 ksi). Clearly, there are aluminum alloys available with much higher yield strength values such as 7001 (90 ksi) or 7075 (75 ksi). Alloys 7001 and 7075, however, are highly susceptible to hot cracking during welding and are not used in welded structures. This cracking tendency can be attributed to the high solute levels of Zn and Mg combined with the effect of Cu in increasing the solidification range. A large solidification range allows more time for the deleterious effect of solidification shrinkage and thermal contraction to contribute to tearing of interdendritic liquid films. This illustrates an example of conflicting alloy design goals of strength and weldability. It would clearly be desirable to provide the bicycle industry with ultra-high strength alloys that can be welded and used in welded frames.

To evaluate the technical merit of using a new grain refining system in a 7XXX alloy, two alloys with levels of Zn, Mg and Cu similar to that of 7001 and 7075 were redesigned by removing the Mn and Cr and introducing Sc+Zr with two different Sc levels. Each of the alloys were cast and hot rolled to a thickness of 3.0 mm. The specific alloy compositions are listed below along with the compositions of 7001 and 7075.

| Alloy | Zn | Mg | Cu | Mn | Cr | Sc | Zr |
|---|---|---|---|---|---|---|---|
| 7001 | 7.4 | 3.0 | 2.1 | | 0.20 | 0.22 | |
| 7075 | 5.6 | 2.5 | 1.6 | | 0.30 | 0.23 | |
| new 7XXX, #1 | 6.1 | 2.9 | 2.1 | | | | 0.20 | 0.11 |

-continued

| Alloy | Zn | Mg | Cu | Mn | Cr | Sc | Zr |
|---|---|---|---|---|---|---|---|
| new 7XXX, #2 | 6.5 | 2.9 | 2.0 | | | 0.40 | 0.11 |

The alloys are most similar to 7001 with less Zn content. Three 5XXX type filler alloys were also fabricated for use in welding trials with the two newly configured 7XXX alloys. Along with the conventional 5356 type filler alloy that contains Mn, Ti and Cr, two new filler alloys were produced using Ti+Sc for one variant and Sc alone for the other variant.

| Alloy | Mg | Mn | Cr | Sc | Ti |
|---|---|---|---|---|---|
| 5356 | 5.2 | 0.10 | 0.12 | | 0.13 |
| new 5XXX, #1 | 5.4 | | | 0.21 | 0.05 |
| new 5XXX, #2 | 5.4 | | | 0.28 | |

A common weldability test, the Houldcroft crack susceptibility test was used to evaluate the weldability of different combinations of the listed filler alloys and base metals. Restraint in the weld is increased by machined slots perpendicular to the welding direction, thereby exaggerating cracking. Throughout our alloy development programs, we have observed that non-weldable aluminum alloys can display cracking levels as high as 63%.

As illustrated in FIG. 1, the use of a Sc containing filler alloy Al - 5.4 Mg - 0.28 Sc combined with a base alloy of Al - 6.1 Zn - 2.9 Mg - 2.1 Cu - 0.20 Sc - 0.11 Zr displays 0% or no cracking in the Houldcroft test. Importantly, it appears that increasing the Sc level to 0.40% in the base metal actually results in a higher level of cracking. This can perhaps be attributed to excess Sc forming coarse primary particles that were not well distributed. Upon remelting of the base alloy during welding and mixing with the filler alloy, these coarse particles would not be effective in renucleating grains in the weld metal or inhibiting grain growth in the heat affected zone.

In viewing the literature of aluminum welding metallurgy, one skilled in the art can appreciate that these welding results are unprecedented and that no results of this sort have ever been reported in the public domain. It is significant that a high strength, 7XXX type alloy can be welded with a 5XXX type filler alloy using the alloy design principles of the invention and no cracking is observed in an exaggerated hot cracking test. Translation of this behavior into a real world welding fabrication endeavor where weld restraint can be a large factor would indicate that designers of welded structures can now begin to rethink their design approach to use high strength alloys. Even though these 7XXX alloys have been in use since the late 1930's, the problem of weldability has not been solved up to this point.

To revisit how a designer of a bicycle frame can now introduce the weldable, ultra-high strength Al-Zn-Mg-Cu-Sc-Zr alloy for the commonly used 7005, equations can be set up to determine the tube thickness that can be used with a new alloy to take advantage of the high strength levels. The stress state of any tube in a bike frame is primarily bending. Accordingly, a designer would consider basic engineering equations for the yielding moment of inertia $M_y$, which should be avoided to prevent permanent yielding of the tube.

This value $M_y$, is proportional to the product of the materials yield strength $\sigma_y$ and the moment of inertia I:

$M_y \alpha \sigma_y I$, where $I = \pi D^4 (1-d/D)^4$

The value d is the inside diameter of the tube and D is the outside diameter of the tube. Since the design will consider the same yielding moment $M_y$, the product $\sigma_y I$ for 7X01M (X=indicates an alloy modified with the new alloying principles) and mainstay bicycle alloy 7005 can be set equal to one another to determine the ultimate weight reduction of a frame implementing the new alloy, in other words:

$$\sigma_y)_{7X01} = \sigma_y I)_{7005}$$

or $$\{[\sigma_y][\pi D^4 (1-d/D)^4]\}_{7X01} = \{[\sigma_y][\pi D^4 (1-d/D)^4]\}_{7005}$$

The yield strength values of 7X01 (90 ksi) and 7005 (40 ksi) can then be entered into the equation along with a value for the outside diameter of the existing 7005 tube design, 1.5 inches, and the inside diameter of the existing 7005 tube, 1.44 inches. This gives a wall thickness of 0.060 inches for the 7005 tube. For the new 7001 tube, we can assume the same outside diameter, 1.5 inches, and then solve the equation for the inside diameter of the 7X01 tube.

Using the considerations above, the calculated inside diameter of the new 7001 tube for a bike frame is 1.475 inches or a wall thickness of 0.025 inches. Compared to the 0.060 inch wall thickness required for the existing 7005 design, a new frame design using the new weldable, high strength alloy can weigh less than half that of the existing bike frame. A four pound frame can be substituted for a frame that is less than two pounds. A weight reduction of this magnitude would give a rider a significant increase in climbing ability. In recalling the weight reduction article from a mountain bike magazine where a few hundred grams are shaved from a bike's total weight by replacing components, the frame design example given here compares favorably since over 1000 grams can be saved. Moreover, this principle can be applied to components to produce unprecedented weight reductions using the new alloys. All of the other advantageous characteristics of these alloys can be implemented into bicycle manufacturing and design of frames and components, including the improved 1) hot working capability, 2) fatigue resistance, 3) hot and cold formability, 4) weldability and weld strength, 5) extrudability and forgeability and 6) grain structure.

EXAMPLE 2

Aluminum alloys are competitive with most high strength steel and titanium alloys at ambient temperature when density is taken into consideration. When service temperatures exceed about 100° C., aluminum alloys begin experiencing a loss in strength and strength values drop to less that half of the ambient temperature strength value when temperatures exceed 200° C. Out of all aluminum alloys, alloy 2618 (Al - 2.4 Cu - 1.0 Ni - 1.0 Fe - 0.20 Si) is the leading alloy for use where elevated temperatures are encountered. Current demanding applications that are now utilizing this alloy include the Concorde aircraft which travels at speeds that induce heating the skin surface and engine components where exposure to elevated temperatures occurs.

To evaluate the feasibility of using the alloy design concepts of this invention to design a new alloy for elevated temperature use, two variants employing the Sc+Zr additions were cast and rolled into sheet along with a 2618 type variant. The compositions are listed below.

| Alloy | Cu | Mg | Ni | Fe | Si | Sc | Zr |
|---|---|---|---|---|---|---|---|
| 2618 | 3.5 | 1.6 | 1.4 | 1.6 | 0.40 | | |
| 2X18, #1 | 2.5 | 1.6 | 1.0 | 1.6 | 0.30 | 0.15 | 0.16 |
| 2X18, #2 | 2.6 | 1.6 | 1.5 | 1.4 | 0.30 | 0.45 | 0.22 |

Each of the alloys was then solution heat treated at 490° C. for one hour, water quenched, stretched 5% and then aged at different time intervals at 180° C. A three point bend test was then used to evaluate the 0.2% offset strength at each time interval. As Table 2 indicates, the Sc and Zr additions provide up to a 73% strength advantage over the mainstay elevated temperature alloy 2618. It is observed that the 0.15 Sc level affords higher strength than the 0.45 Sc level for these aging parameters.

TABLE 2

| | Stress Value at 0.2% Strain, ksi (% improvement over 2618) Aging Time in Hours | | | | |
|---|---|---|---|---|---|
| Alloy | 0 | 4 | 8 | 20 | 40 |
| 2618 | 48.8 | 49.2 | 50.1 | 50.6 | 47.9 |
| 2X18, #1 | 80.8 (65) | 85.2 (73) | 85.2 (70) | 84.0 (66) | 79.1 (65) |
| 2X18, #2 | 56.6 (16) | 69.3 (41) | 65.4 (31) | 67.0 (33) | 68.3 (43) |

Because 2618 is considered a non weldable alloy by virtue of its low Cu content, a Houldcroft weld crack sensitivity test was conducted to determine whether this type of alloy can exhibit improved weldability. Three filler alloys, a conventional 2319 type filler alloy and two new filler alloys were designed using the principles of this invention. The compositions of the filler alloys are listed below.

| Alloy | Cu | V | Mn | Ti | Zr | Sc |
|---|---|---|---|---|---|---|
| 2319 | 6.5 | 0.13 | 0.33 | 0.11 | 0.30 | |
| 2X19, #1 | 4.9 | | | | 0.13 | 0.35 |
| 2X19, #2 | 6.0 | | | 0.11 | 0.22 | 0.40 |

Figure 2:
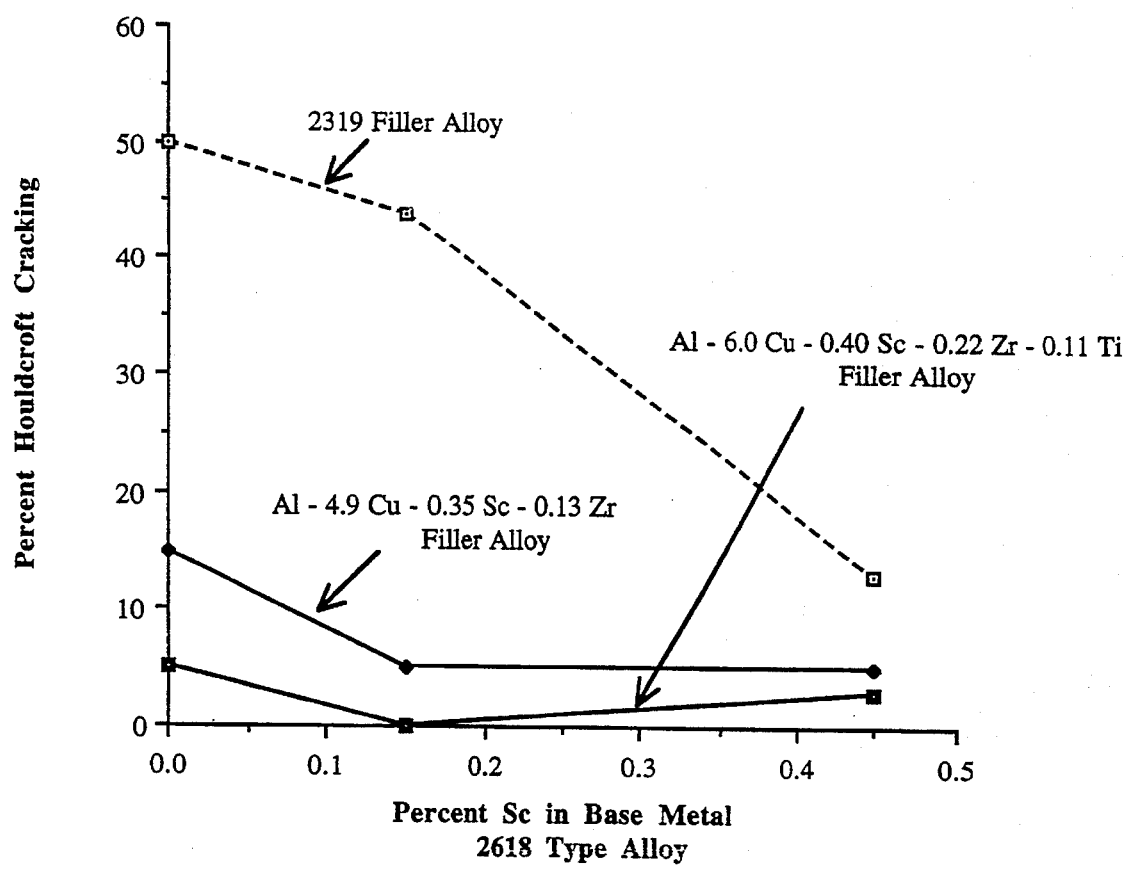
FIG. 2 illustrates the percentage of weld cracking in the Houldcroft crack susceptibility test for two Al-Cu-Sc-Zr-(Ti) filler alloys and a conventional 2319 type filler alloy in combination with alloy 2618 and two modified Al-Cu-Mg-Ni-Fe base alloys with various levels of Sc+Zr additions.

As shown in FIG. 2, the combination of a conventional 2319 type filler alloy used to weld 2618 results in 50% cracking in the Houldcroft test. Use of 2319 on alloy variants with 2X19, #1 and 2X19, #2 results in less cracking, although cracking still occurs in the range of 13% to 44%. Clearly, the best results are attained with the modified higher strength alloys combined with the redesigned filler alloys. Surprisingly, use of a base alloy with 0.15 Sc+0.16 Zr welded with a filler alloy containing 0.40 Sc+0.22 Zr results in 0% or no hot cracking. Again, a non-weldable alloy has been converted to a weldable alloy using the principles of alloy design in this invention. A designer of a system where an aluminum alloy is to be used in an elevated temperature environment can now consider an alloy with the potential for a 73% strength increase that displays excellent weldability.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. Recreational products comprising aluminum alloys, said aluminum alloys comprising:
   from about 0.2 to about 1.8 weight percent silicon;
   from about 0.2 to about 0.8 weight percent manganese;
   from about 0.4 to about 1.4 weight percent magnesium;
   from about 0.02 to about 10.0 weight percent scandium;
   from about 0.10 to about 1.0 weight percent zirconium; and
   from about 60 to about 99 weight percent aluminum, wherein any presence of chromium in said alloy is as an unavoidable impurity.

2. Recreational products as claimed in claim 1, wherein said aluminum alloy is a 6XXX type alloy.

3. Recreational products as claimed in claim 2, wherein said recreational products are selected from the group consisting of bicycle components and racquets.

4. Recreational products as claimed in claim 3, wherein said bicycle components are selected from the group consisting of handlebars, pedals, seat posts, handlebar stems, wheel rims, cranks, crank arms, handlebar extensions, brake mechanisms, spokes, bottle cages, racks, derailleurs, saddles and suspension forks.

5. Recreational products as claimed in claim 3, wherein said racquets are selected from the group consisting of tennis racquets, squash racquets, badminton racquets and racquetball racquets.

6. Recreational products comprising aluminum alloys, said aluminum alloys comprising:
   from about 4.0 to about 9.0 weight percent zinc;
   from about 0.6 to about 3.8 weight percent magnesium;
   from about 0.1 to about 3.0 weight percent copper;
   from about 0.2 to about 10.0 weight percent scandium;
   from about 0.10 to about 1.0 weight percent zirconium; and
   from about 60 to about 96 weight percent aluminum, wherein any presence of chromium in said alloy is as an unavoidable impurity.

7. Ground transportation structures comprising aluminum alloys, said aluminum alloys comprising:
   from about 0.2 to about 1.8 weight percent silicon;
   from about 0.2 to about 0.8 weight percent manganese;
   from about 0.4 to about 1.4 weight percent magnesium;
   from about 0.02 to about 10.0 weight percent scandium;
   from about 0.10 to about 1.0 weight percent zirconium; and
   from about 60 to about 99 weight percent aluminum, wherein any presence of chromium in said alloy is as an unavoidable impurity.

8. Recreational products as claimed in claim 6, wherein said aluminum alloy is a 7XXX type alloy.

9. Recreational products as claimed in claim 6, wherein said recreational products are selected from the group consisting of bats, arrows, ski poles, hockey sticks, bicycle frames, bicycle components, golf shafts, golf club heads, racquets, athletic wheelchairs, tent poles, snowshoes, backpack frames, wind surfing frames, lacrosse sticks, sailboat masts and booms, javelins, motorbikes, motorbike components, jetskis and snowmobiles.

10. Aerospace structures comprising aluminum alloys, said aluminum alloys comprising:
    from about 4.0 to about 9.0 weight percent zinc;
    from about 0.6 to about 3.8 weight percent magnesium;
    from about 0.1 to about 3.0 weight percent copper;
    from about 0.2 to about 10.0 weight percent scandium;
    from about 0.10 to about 1.0 weight percent zirconium; and
    from about 60 to about 96 weight percent aluminum, wherein any presence of chromium in said alloy is as an unavoidable impurity.

11. Aerospace structures and components as claimed in claim 10, wherein said aluminum alloy is a 7XXX type alloy.

12. Aerospace structures and components as claimed in claim 11, wherein said 7XXX type alloy is a high strength 7XXX type alloy.

13. Aerospace structures and components as claimed in claim 12, wherein said aerospace structures and components are selected from the group consisting of upper wing skins, lower wing skins, seat tracks, fuselage skins, propellers, fuselage frames, stingers, floor beams, cargo tracks, leading edges, avionic equipment mountings and cases, and integrally stiffened extruded barrel panels for aircraft, and skirt structures, inner tank structures, isogrid structures and integrally stiffened extruded barrel panels for launch vehicles.

14. Aerospace structures and components as claimed in claim 11, wherein said 7XXX type alloy is a weldable 7XXX type alloy.

15. Aerospace structures and components as claimed in claim 14, wherein said aerospace structures and components are selected from the group consisting of upper wing skins, lower wing skins and integrally stiffened extruded barrel panels for aircraft, and propellant tanks, including domes, skirt structures, inner tank structures, isogrid structures and integrally stiffened extruded barrel panels for launch vehicles.

16. Ground transportation structures comprising aluminum alloys, said aluminum alloys comprising:
    from about 4.0 to about 9.0 weight percent zinc;
    from about 0.6 to about 3.8 weight percent magnesium;
    from about 0.1 to about 3.0 weight percent copper;
    from about 0.02 to about 10.0 weight percent scandium;
    from about 0.01 to about 1.0 weight percent zirconium; and
    from about 60 to about 96 weight percent aluminum, wherein any presence of chromium in said alloy is as an unavoidable impurity.

17. Ground transportation structures as claimed in claim 7, wherein said aluminum alloy is 6XXX type alloy.

18. Ground transportation structures as claimed in claim 7, wherein said ground transportation structures are selected from the group consisting of automotive space frames, sheet products, including body panels, hoods, doors and inner panels), seat frames, people movers, including shuttle buses and monorails, and mounting brackets and details.

19. Ground transportation structures as claimed in claim 16, wherein said aluminum alloy is a 7XXX type alloy.

20. Ground transportation structures as claimed in claim 19 wherein said 7XXX type alloy is a high strength 7XXX type alloy.

21. Ground transportation structures as claimed in claim 20, wherein said ground transportation structures are selected from the group consisting of bumpers, sheet products, including body panels, hoods, doors and inner panels, connecting rods, armor plate, people movers, including shuttles and monorails, suspension parts and mounting brackets and details.

22. Ground transportation structures as claimed in claim 19, wherein said 7XXX type alloy is a weldable 7XXX type alloy.

23. Ground transportation structures as claimed in claim 22, wherein said ground transportation structures are selected from group consisting of automotive space frames, bumpers, sheet products, including body panels, hoods, doors and inner panels, seat frames, armor plate, liquid and cryogenic liquid transportation tanks, people movers, including shuttles and monorails, suspension parts and mounting brackets and details.

24. Marine structures comprising aluminum alloys, said aluminum alloys comprising:
from about 4.0 to about 9.0 weight percent zinc;
from about 0.6 to about 3.8 weight percent magnesium;
from about 0.1 to about 3.0 weight percent copper;
from about 0.02 to about 10.0 weight percent scandium;
from about 0.01 to about 1.0 weight percent zirconium; and
from about 60 to about 96 weight percent aluminum, wherein any presence of chromium in said alloy is as an unavoidable impurity.

25. Marine structures as claimed in claim 24, wherein said aluminum alloy is a 7XXX type alloy.

26. Marine structures as claimed in claim 25, wherein said 7XXX type alloy is a high strength 7XXX type alloy.

27. Marine structures as claimed in claim 26, wherein said marine structures are selected from the group consisting of torpedo casings, sea launched missiles and naval fighter aircraft.

28. Marine structures as claimed in claim 25, wherein said 7XXX type alloy is a weldable 7XXX type alloy.

29. Marine structures as claimed in claim 28, wherein said marine structures are selected from the group consisting of torpedo casings, sea launched missiles and naval fighter aircraft.

* * * * *